(12) United States Patent
Anderson et al.

(10) Patent No.: US 10,282,563 B2
(45) Date of Patent: May 7, 2019

(54) VIDEO-BASED PRIVACY SUPPORTING SYSTEM

(75) Inventors: William Robert Anderson, Owings Mills, MD (US); Steven E. Turner, Fallston, MD (US); Steven Pujia, Owings Mills, MD (US)

(73) Assignee: Tobii AB, Danderyd (SE)

( * ) Notice: Subject to any disclaimer, the term of this patent is extended or adjusted under 35 U.S.C. 154(b) by 312 days.

(21) Appl. No.: 12/701,504

(22) Filed: Feb. 5, 2010

(65) Prior Publication Data

US 2010/0205667 A1    Aug. 12, 2010

Related U.S. Application Data

(60) Provisional application No. 61/150,336, filed on Feb. 6, 2009.

(51) Int. Cl.
  *G06F 3/01*     (2006.01)
  *G06F 21/32*    (2013.01)
  (Continued)

(52) U.S. Cl.
  CPC .............. *G06F 21/84* (2013.01); *G06F 3/013* (2013.01); *G06F 3/017* (2013.01); *G06F 21/32* (2013.01);
  (Continued)

(58) Field of Classification Search
  CPC .......... G06F 21/30; G06F 21/31; G06F 21/32; G06F 21/60; G06F 21/62; G06F 21/70;
  (Continued)

(56) References Cited

U.S. PATENT DOCUMENTS

| 6,111,517 A | 8/2000 | Atick et al. |
| 6,182,114 B1 | 1/2001 | Yap et al. |

(Continued)

OTHER PUBLICATIONS

Murph, Hitachi's face-recognizing display turns off, saves power when you look away (video), Engadget, Oct. 10, 2009, engadget.com.

(Continued)

*Primary Examiner* — Shanto Abedin
*Assistant Examiner* — Adrian Stoica
(74) *Attorney, Agent, or Firm* — Kilpatrick Townsend & Stockton LLP

(57) ABSTRACT

Computer display privacy and security for computer systems. In one aspect, the invention provides a computer-controlled system for regulating the interaction between a computer and a user of the computer based on the environment of the computer and the user. For example, the computer-controlled system provided by the invention comprises an input-output device including an image sensor configured to collect facial recognition data proximate to the computer. The system also includes a user security parameter database encoding security parameters associated with the user; the database is also configured to communicate with the security processor. The security processor is configured to receive the facial recognition data and the security parameters associated with the user, and is further configured to at least partially control the operation of the data input device and the data output device in response to the facial recognition data and the security parameters associated with the user.

20 Claims, 17 Drawing Sheets

(51) Int. Cl.
*G06F 21/62* (2013.01)
*G06F 21/84* (2013.01)

(52) U.S. Cl.
CPC ...... *G06F 21/62* (2013.01); *G06F 2221/2149* (2013.01)

(58) Field of Classification Search
CPC . G06F 21/82; G06F 21/84; G06F 3/00; G06F 3/002; G06F 3/005; G06F 3/01; G06F 3/011; G06F 3/013; G06F 3/017; G06F 21/6218; G06F 21/6245; G06F 3/012
See application file for complete search history.

(56) References Cited

U.S. PATENT DOCUMENTS

| | | | |
|---|---|---|---|
| 6,393,136 B1* | 5/2002 | Amir et al. | 382/103 |
| 6,496,117 B2 | 12/2002 | Gutta et al. | |
| 6,603,491 B2* | 8/2003 | Lemelson | G06F 3/013 715/784 |
| 7,216,221 B2 | 5/2007 | Bear et al. | |
| 7,284,201 B2 | 10/2007 | Cohen-solal | |
| 7,986,816 B1* | 7/2011 | Hoanca et al. | 382/115 |
| 8,141,159 B2 | 3/2012 | Peled et al. | |
| 2005/0066165 A1 | 3/2005 | Peled et al. | |
| 2005/0099288 A1 | 5/2005 | Spitz et al. | |
| 2006/0049940 A1* | 3/2006 | Matsuhira et al. | 340/541 |
| 2006/0210167 A1* | 9/2006 | Inoue et al. | 382/190 |
| 2006/0288234 A1 | 12/2006 | Azar et al. | |
| 2007/0150827 A1 | 6/2007 | Singh | |
| 2007/0250920 A1* | 10/2007 | Lindsay | 726/7 |
| 2007/0252001 A1 | 11/2007 | Kail et al. | |
| 2008/0051957 A1 | 2/2008 | Breed et al. | |
| 2008/0244712 A1* | 10/2008 | Kitada et al. | 726/5 |
| 2008/0297589 A1* | 12/2008 | Kurtz et al. | 348/14.16 |
| 2009/0232357 A1* | 9/2009 | Angell et al. | 382/103 |
| 2009/0251560 A1 | 10/2009 | Azar et al. | |
| 2009/0273562 A1 | 11/2009 | Baliga et al. | |
| 2009/0307601 A1* | 12/2009 | Kumhyr et al. | 715/741 |
| 2009/0310828 A1* | 12/2009 | Kakadiaris et al. | 382/118 |

OTHER PUBLICATIONS

Oculislabs, PrivateEye—Whitepaper, Nov. 6, 2009, Oculis Labs.
Oculislabs, Chameleon—Product Description, Dec. 7, 2009, Oculis Labs.
Oculislabs, Protect your Privacy with PrivateEye—Product Description, Dec. 7, 2009, Oculis Labs.
Tarzia et al, Sonar-based Measurement of User Presence and Attention, Proceedings of the 11th international conference on Ubiquitous computing, Sep. 30, 2009, ACM International Conference Proceeding Series, pp. 89-92, ACM.
Kirk, Screen-blocking Systems Stop Prying Eyes, Jul. 27, 2009, pcworld.about.com.
Pcwinsoft Systems, 1AVMonitor 1.6.4.00, Jun. 17, 2009, lavmonitor. smartcode.com.
Lim, Being Mobile + Working Public = Shoulder surfers' delight!, Apr. 11, 2008, theory.isthereason.com.
Sensiblevision, Dell FaceAware FAQ, Nov. 18, 2009, www.sensiblevision.com.
Kumar et al., Reducing shoulder-surfing by using gaze-based password entry, ACM International Conference Proceeding Series; Proceedings of the 3rd symposium on Usable privacy and security, Mar. 19, 2007, vol. 229, pp. 13-19, ACM.
Haurant, Device to combat 'shoulder surfing', Guardian News and Media, May 23, 2006, guardian.co.uk.
McChesney, CCTV surveillance continues to evolve as it begins to include intelligent video software, Security Products, Jan. 1, 2006, vidient.com
Potkewitz, Face-saving properties will give cell phones added bit of security, Los Angeles Business Journal, Mar. 20, 2006, highbeam.com.
Wirelesswatchjapan, OKI Launches Face Sensing Engine 3.0, WirelessWatchJapan, Oct. 2, 2006, wirelesswatch.jp.
Dalton et al., Sensing User Intention and Context for Energy Management, Proceedings of HotOS IX: The 9th Workshop on Hot Topics in Operating Systems, May 18, 2003, HotOS.
Rikert et al., Gaze Estimation using Morphable Models, IEEE Computer Society Press, Apr. 1, 1998, pp. 436-441, IEEE.
Dadgostar and Sarrafzadeh, An adaptive real-time skin detector based on Hue thresholding: A comparison on two motion tracking methods, Pattern Recognition Letters, Mar. 20, 2006, vol. 27, No. 12, pp. 1342-1352, DOI doi:10.1016/j.patrec.2006.01.007.
Hewitt, Seeing with OpenCV, pt 1, Servo Magazine, Jan. 1, 2007, vol. 01, pp. 62-66.
Hewitt, Seeing with OpenCV, pt 2, Servo Magazine, Feb. 1, 2007, vol. 02, pp. 48-52.
Hewitt, Seeing with OpenCV, pt 3, Servo Magazine, Mar. 1, 2007, vol. 03, pp. 36-40.
Hewitt, Seeing with OpenCV, pt 4, Servo Magazine, Apr. 1, 2007, vol. 04, pp. 36-39.
Hewitt, Seeing with OpenCV, pt 5, Servo Magazine, May 1, 2007, vol. 05, pp. 44-50.
Hsu et al., Face Detection in Color Images, IEEE Transactions on Pattern Analysis and Machine Intelligence, May 1, 2002, vol. 24, No. 5, pp. 696-706.
Kotropoulos et al., Frontal face authentication using morphological elastic graph matching, IEEE Transactions on Image Processing, Apr. 1, 2000, vol. 9, No. 4, pp. 555-560.
ISR for PCT/US10/23414.
Robin Hewitt, Seeing with OpenCV, pt 1, Servo Magazine, Jan. 2007, pp. 62-66, vol. 01.
Robin Hewitt, Seeing with OpenCV, pt 2, Servo Magazine, Feb. 2007, pp. 48-52, vol. 02.
Robin Hewitt, Seeing with OpenCV, pt 3, Servo Magazine, Mar. 2007, pp. 36-40, vol. 03.
Robin Hewitt, Seeing with OpenCV, pt 4, Servo Magazine, Apr. 2007, pp. 36-40, vol. 04.
Robin Hewitt, Seeing with OpenCV, pt 5, Servo Magazine, May 2007, pp. 44-50, vol. 05.
Farhad Dadgostar, Abdolhossein Sarrafzadeh, An adaptive real-time skin detector based on Hue thresholding: A comparison on two motion tracking methods, Pattern Recognition Letters, Sep. 2006, pp. 1342-1352, vol. 27, No. 12.
R.L. Hsu, M. Abdel-Mottaleb, A.K. Jain, Face Detection in Color Images, IEEE Transactions on Pattern Analysis and Machine Intelligence, May 2002, pp. 696-706, vol. 24, No. 5.
Constantine Kotropoulos, Anastasios Tefas, Ioannis Pitas, Frontal face authentication using morphological elastic graph matching, IEEE Transactions on Image Processing, Apr. 2000, pp. 555-560, vol. 9, No. 4.

* cited by examiner

VIDEO-BASED PRIVACY SUPPORTING SYSTEM

1 CROSS REFERENCE TO RELATED U.S. PATENT APPLICATIONS

The present application claims priority under 35 U.S.C. § 119(e) to provisional U.S. Patent Application Ser. No. 61/150,336, filed 6 Feb. 2009, which application is incorporated herein by reference in its entirety and for all purposes.

2 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright 2009-2010, Oculis Labs.

3 BACKGROUND OF THE INVENTION

3.1 Field of the Invention

The exemplary, illustrative, technology herein relates to computer hardware and computer software executed on computer hardware, computer-based systems, and computer-based methods for maintaining computer user privacy while using computer-based data processing and communications equipment. The technology herein has applications in the areas of data processing, portable computing, computer-based communications, computer security, and data privacy maintenance.

3.2 The Related Art

Off-the-shelf desktop and portable computers and computer-controlled devices, such as laptop computers, netbooks, tablet computers, personal digital assistants ("PDAs"), and smartphones (referred to generally herein as a "device" or "devices"), cannot adequately maintain privacy for information displayed to the user while the device is in use. It is possible for unauthorized persons to see, or even record, such information from nearby locations, such as over the shoulder of the device user, while the authorized user is viewing it, a practice commonly referred to as "shoulder surfing". With the increasing use of portable computers in public locations, and growth in regulations such as the Health Insurance Portability and Accountability Act of 1996 ("HIPAA") that make protection of certain information a legal requirement, display of information in a manner that permits unauthorized viewing, whether in public, semi-public, and even restricted locations, is becoming increasingly problematic. For instance, a patient's medical records brought up on a screen in a doctor's office might be viewable by those sitting in a nearby waiting room, or by maintenance personnel working in the office. An e-mail announcing the award of a major contract to a publicly held company might be composed in an airport lobby, and viewed by another passenger waiting nearby who spreads this sensitive information before it was intended to be publicly known. There are many ways that unauthorized viewing of displayed data can result in harm. Restricting display of sensitive data to times or locations where privacy can be ensured is not a practical solution to this problem given the pace of modern business and life in general combined with the ever increasing capabilities of portable computing equipment. Some means of permitting display of information to authorized users, while detecting, limiting or preventing disclosure to others, is needed.

Prior art technology for protection of displayed data includes software commonly referred to as "screen savers". Originally created to prevent damage to Cathode Ray Tube ("CRT") monitors, which could "burn in" a persistently displayed image and leave it permanently displayed on the CRT's phosphor, these programs also have some utility for preventing unauthorized viewing of on-screen data or even use of the computer. When there has been no user input to the computer (e.g., keyboard input or pointing device movement) for a set period of time, generally anything from one minute to 15 minutes, the screen saver activates and replaces the displayed information with some non-static display, such as a slide show of images, output of a graphic generating program, scrolling message, etc. When input resumes, such as by typing a key or moving a mouse, the screen saver deactivates and the prior information display is restored. Some screen savers support a requirement that re-authentication be performed, such as by entering a password, before the screen saver will deactivate and return to the prior display. However, while screen savers can offer some limit to the access of displayed data when the user is not using the computer, they have several serious limitations when it comes to preserving privacy of on-screen data: First, screen savers do not protect data privacy while the user is actively working; second, there is a delay between the user ceasing work, and perhaps moving away from the computer, and the screen saver activating; and third, anyone can prevent activation of the screen saver after the authorized user leaves the area by providing input to the computer, such as by moving the mouse or pressing a key on the keyboard, and thus gain extra time to read the display.

Another prior art technology for privacy protection is the "privacy filter", a physical device that can be added to the front of a display to reduce the angle of visibility of the display and limit or completely block viewing at predetermined angles. Such privacy filters also have significant limitations, since they can do nothing to prevent unauthorized viewing from a position directly behind the user and are sometimes less effective at reducing visibility angles from above or below than they are at reducing visibility angles from the sides. Their limited effectiveness is especially pronounced with monitors that can be rotated between "portrait" and "landscape" orientations. Privacy filters also can sometimes reduce the available display brightness by 30% or more and may also change display contrast or distort the display image, so some users, especially those with some degree of sight impairment, do not like using them. Privacy filters are also typically removable, which permits users to disable their protection and so to violate security policies, without such violations being detectable.

Both of the above-described prior art techniques for protecting the display of information on a computer from authorized viewing also suffer from their inherent "all-or-nothing" scope, i.e., either must be applied to the entire screen. Recent advances in the use of gaze tracking have provided alternative methods for protecting data displayed on a computer from authorized viewing that are more "intelligent". An important advance in such alternative methods, described by Anderson, et al., in U.S. patent application Ser. No. 12/325,191, filed 29 Nov. 2008 and published as U.S. Patent Application Publication No. 2009/

0141895 A1, and which is incorporated herein by reference in its entirety and for all purposes, provides computer systems, software, and methods for protecting the display of data using gaze tracking information of the user to limit the display of intelligible data to only that area defined by the user's gaze. Data outside the of the gaze area is obscured so as to be rendered unintelligible. A similar, albeit later and less robust, approach is described by Baliga, et al., in U.S. Patent Application Publication No. 2009/0273562 A1.

Despite the great improvements brought by the invention described in the above-mentioned '895 application, all of the foregoing methods and devices lack any ability to track and log incidents where sensitive data may have been disclosed, or to whom such data may have been disclosed. In some situations it can be useful—even critical—to know that data has been seen by unauthorized persons, and to have at least useful clues as to who they are, and whether they merely glanced at the screen, or studied it closely, or took notes, or even recorded the information using devices such as cameras or video recorders. A means for overcoming these deficiencies of the prior art would be advantageous.

Moreover, the above-described methods and systems are usually applied in a static or modal format. In other words, the user must implement some command or other deliberate action to change the degree of security to the extent any such change in degree is possible. For example, users often want to view data displays and sensitive information not only in relatively secure locations, such as their offices, but also in homes, coffee shops, airports and other unsecured environments where unauthorized individuals or devices can also view their displays, possibly without their knowledge. But users often forget to make adjustments to their security settings to account for the loss of privacy when moving from office to public spaces, thus risking both deliberate and inadvertent security compromise. Thus, some way to automatically adjust the level of security in accordance with the computer's and user's environment would be helpful.

In addition to unauthorized viewing of the display, the degree of privacy of computer-displayed or computer-provided information is also endangered by other means in modern desktop and portable systems. For example, when using computer chat or video-conference software, such as Skype (Skype Limited, Luxembourg, Germany), anything said within the pickup range of the microphone at one end of the call might be heard at the other end of the call. For instance, if a user is on a Skype conference call, and someone enters their office and discloses sensitive information, others on the call may overhear it. Some means to automatically mute the microphone when the user shifts attention from the computer, such as to look at someone entering their office, is needed to reduce the chance that verbal information will be inadvertently disclosed. Likewise, the person entering the office may see the screen display, or have their image transmitted to others on the call, either of which might constitute an improper disclosure of private information. Means to limit this possibility are needed, e.g., by ceasing video transmission, preventing viewing of some or all of the display, or both, when the authorized user shifts attention away from the call.

Also, computing devices of all types, but especially portable computer-based devices, are subject to loss or theft. Indeed, news reports of the compromise of sensitive data, such as Social Security Numbers, health records, credit card numbers, and the like, through the theft of a laptop or other portable computer have become commonplace. Restraint devices, such as locks and cables, have existed for some time, but these devices rely on the availability of something to secure them to, and the user taking the time to employ them. In addition, such restraints are impractical for smaller portable devices, such as cell phones, that would be difficult to use while tethered in such a way, or in situations where the user might need to relocate on short notice, such as while waiting to board an aircraft or while in a waiting room or lobby prior to an appointment. Systems also exist for expediting the return of lost devices, but these require registration of the device, affixing of an identifying label, and that anyone who finds the device take the trouble to follow the instructions to return it through the system. Users do not always register their devices, or maintain the registrations over time, and may not be willing to pay the required fees to do so, and such systems are only useful in the case of a lost device and do not help at all in the case of one that is stolen. A means for preventing or detecting loss or theft, and preventing use by unauthorized persons, engaged automatically or at least with minimal user attention, is needed. If such means can also assist with recovery of the device once lost or stolen, that also would be advantageous.

The needs described above are addressed by the present invention, as described using the exemplary embodiments disclosed herein as understood by those with ordinary skill in the art.

4 SUMMARY OF THE INVENTION

The present invention provides a robust solution for the display privacy and other problems just described that is applicable in a variety of devices. In particular, the present invention provides for privacy protection in portable computing devices that incorporate displays. Using the methods, software, and system provided by the invention, computer users can view data on a computer-controlled display in a variety of secure and unsecured environments with greater security from unwanted and undetected eavesdropping and tampering.

In a first aspect, the present invention provides a computer-controlled system for regulating the interaction between a computer and a user of the computer based on the environment of the computer and the user. In some embodiments, the computer-controlled system provided by the invention comprises an input-output device including an image sensor configured to collect facial recognition data proximate to the computer. The sensor device is further configured to communicate the facial recognition data to a security processor. The system also includes a user security parameter database encoding security parameters associated with the user; the database is also configured to communicate with the security processor. The security processor is configured to receive the facial recognition data and the security parameters associated with the user, and is further configured to at least partially control the operation of the data input device and the data output device in response to the facial recognition data and the security parameters associated with the user.

In some more particular embodiments, the system includes at least one of a video display or a microphone, and, in still more particular embodiments, a video display. Among the latter embodiments are more particular embodiments in which the facial recognition data includes image data relevant to determining the presence of a third party in a region behind the user. Among those embodiments are those in which the security processor is configured to provide a warning upon detecting the presence of a third party in the region, which warning, in yet more particular embodiments, comprises an image of the third party. In other embodiments in which the security processor is configured to provide a warning upon detecting the presence of a third party in the region, the security processor is configured to modify the operation of the video display upon detecting the presence of a third party in the region. In still other embodiments in which the security processor is configured to provide a warning upon detecting the presence of a third party in the region, the system of the invention includes a microphone for collecting sounds from the user, and the security processor is configured to modify the operation of the microphone upon detecting the presence of a third party in the region.

In other embodiments in which the system includes a video display, the image sensor device is further configured to track the user's gaze on the display, and the security processor is configured to modify the operation of the video display upon detecting that the user's gaze is not on the video display. In other such embodiments, the system includes a microphone for collecting sounds from the user, and the security processor is configured to modify the operation of the microphone upon detecting the presence that the user's gaze is not on the video display.

In still other embodiments, the user security parameter database is at a location remote from the computer.

In another aspect, the present invention provides methods for regulating the interaction between a computer and a user of the computer based on the environment of the computer and the user. In some embodiments, the methods comprise obtaining facial recognition data from an image sensor device configured to collect facial recognition data, the sensor device being configured to communicate the facial recognition data to a security processor, and passing the facial recognition data to the security processor; receiving user security parameters from a user security parameter database including data encoding security parameters associated with the user at the security processor; and using the security processor to at least partially control the operation of at least one of a data input device and a data output device connected with the computer in response to the facial recognition data and the security parameters associated with the user.

In other embodiments, the foregoing method includes detecting the presence of a third party in a region extending behind the user. Still other embodiments include displaying a warning to the user in response to detecting the presence of a third party in the region, or modifying the operation of at least one of a video display device or a microphone connected to the computer, or any combination thereof, in response to the detecting the presence of a third party in the region.

Other embodiments of the methods provided by the invention include detecting that the user's gaze has moved away from a video display device connected with the computer, and in more particular embodiments, displaying a warning to the user in response to the detecting the presence of a third party in the region, or modifying the operation of at least one of a video display device or a microphone connected to the computer, or any combination thereof, in response to the detecting the presence of a third party in the region.

In still another aspect, the present invention provides a computer-readable medium containing computer-readable program control devices thereon, the computer-readable program control devices being configured to enable a computer to obtain facial recognition data from an image sensor device configured to collect facial recognition data, the sensor device being further configured to communicate the facial recognition data to a security processor and pass the facial recognition data to the security processor; receive user security parameters from a user security parameter database including data encoding security parameters associated with the user at the security processor; and enable the security processor to at least partially control the operation of a least one of a data input device and a data output device in response to the facial recognition data and the security parameters associated with the user.

In more particular embodiments, the computer-readable program control devices are further configured to cause the security processor to display a warning to the user, or modify the operation of at least one of a video display device or a microphone connected to the computer, or any combination thereof, in response to detecting the presence of a third party in the region. In still more particular embodiments, the computer-readable program control devices are further configured to enable the security processor to determine that the user's gaze has moved away from a video display device connected with the computer. And in still more particular embodiments, the computer-readable program control devices are further configured to enable the security processor to display a warning to the user, or modify the operation of at least one of a video display device or a microphone connected to the computer, or any combination thereof, in response to detecting the presence of a third party in the region.

These and other aspects and advantages will become apparent when the Description below is read in conjunction with the accompanying Drawings.

5 BRIEF DESCRIPTION OF THE DRAWINGS

Figure 3A:
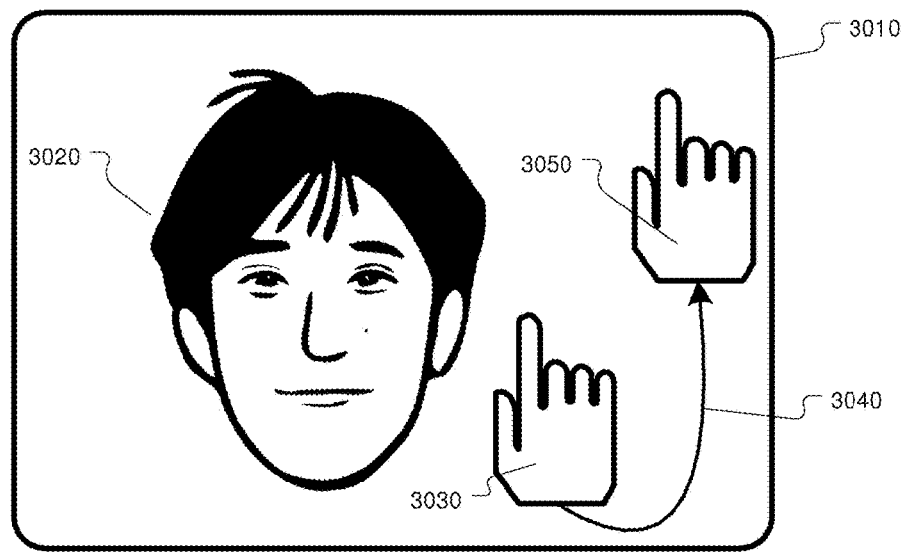
Figure 3B:
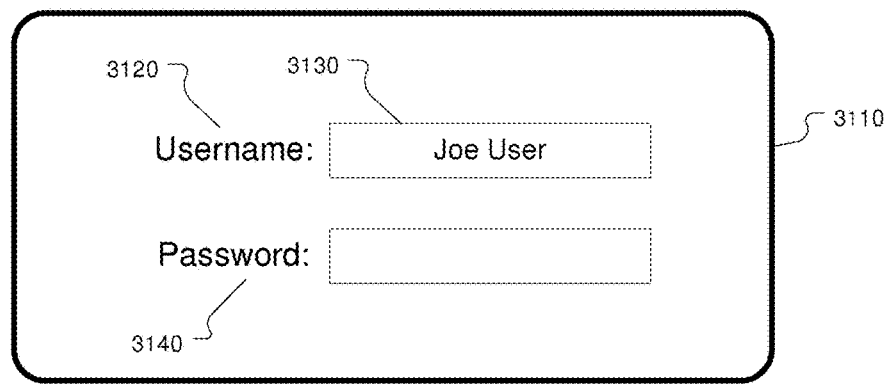
Figure 3C:
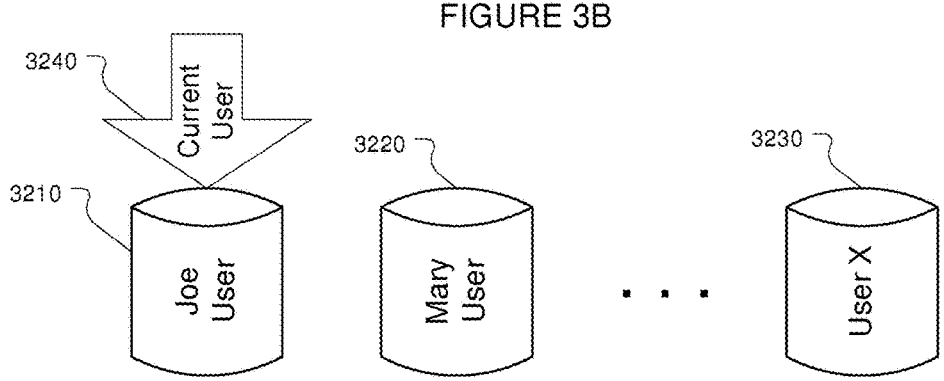

FIGS. 3A-3C illustrate certain aspects related to user authentication according to certain embodiments of the present invention. FIG. 3A illustrates the appearance of a user's face and hand gestures by a webcam or other image sensor in accordance with the present invention. FIG. 3B illustrates the provision of a user identification and authorization dialog in accordance with some embodiments of the present invention. FIG. 3C illustrates schematically the identification and access of user information from a database of user profiles in accordance with some embodiments of the present invention.

Figure 4:
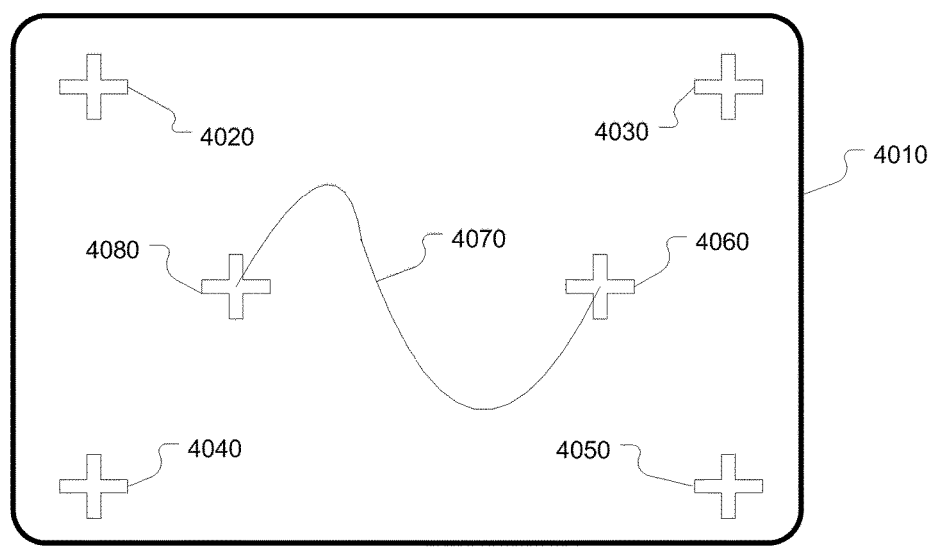

FIG. 4 illustrates a method for calibrating the detection of a user's attention point in accordance with one aspect of the present invention.

Figure 5:
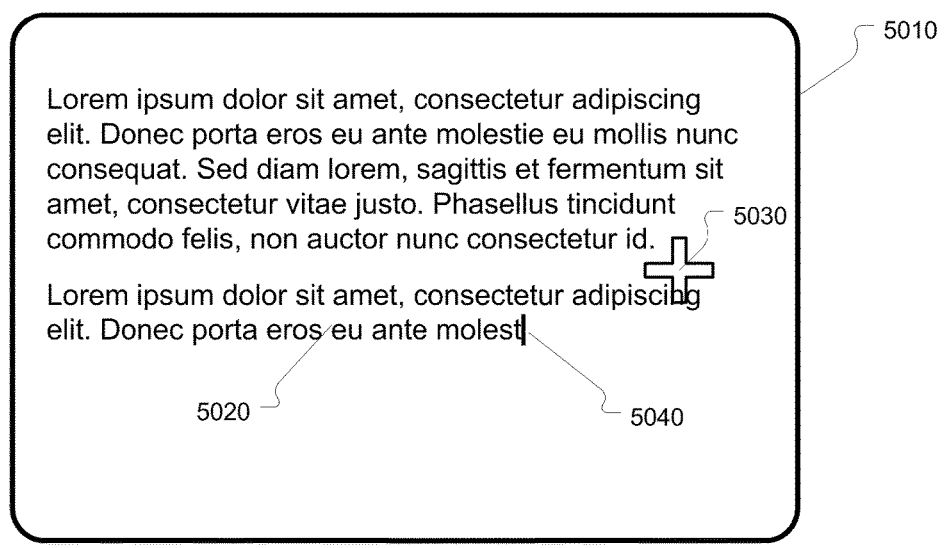

FIG. 5 illustrates automatic determination of attention point error in accordance with one aspect of the present invention.

Figure 6A:
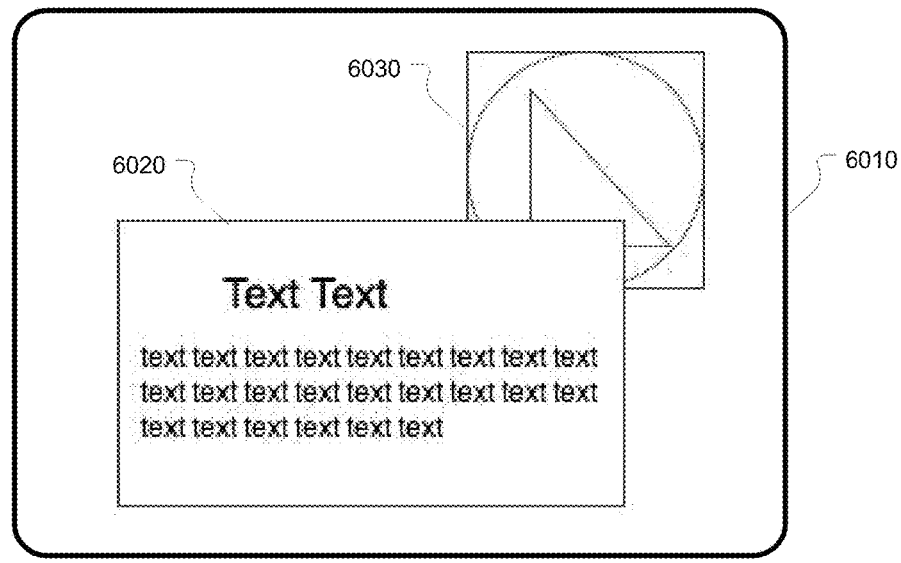
Figure 6B:
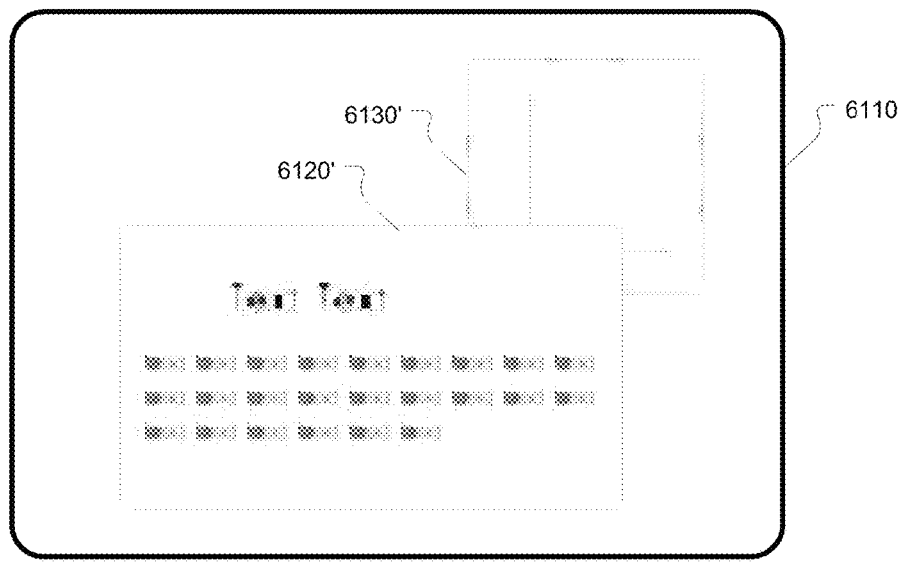

FIGS. 6A and 6B depict unobscured and obscured states of a video display in accordance with the present invention. FIG. 6A depicts an unaltered display (i.e., a display without "obscuration"). FIG. 6B depicts a display that has been altered (i.e., the display has undergone "obscuration") in accordance with the present invention.

Figure 7A:
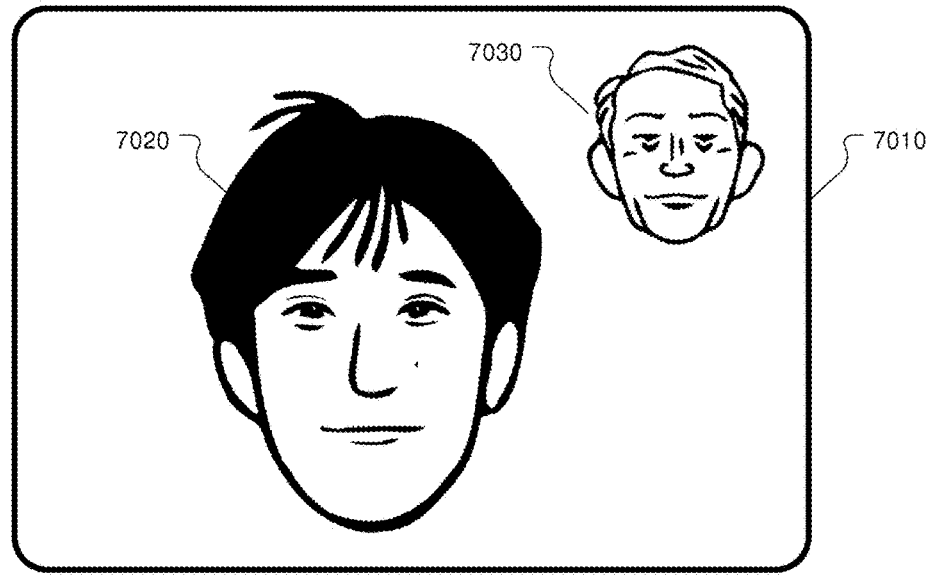
Figure 7B:
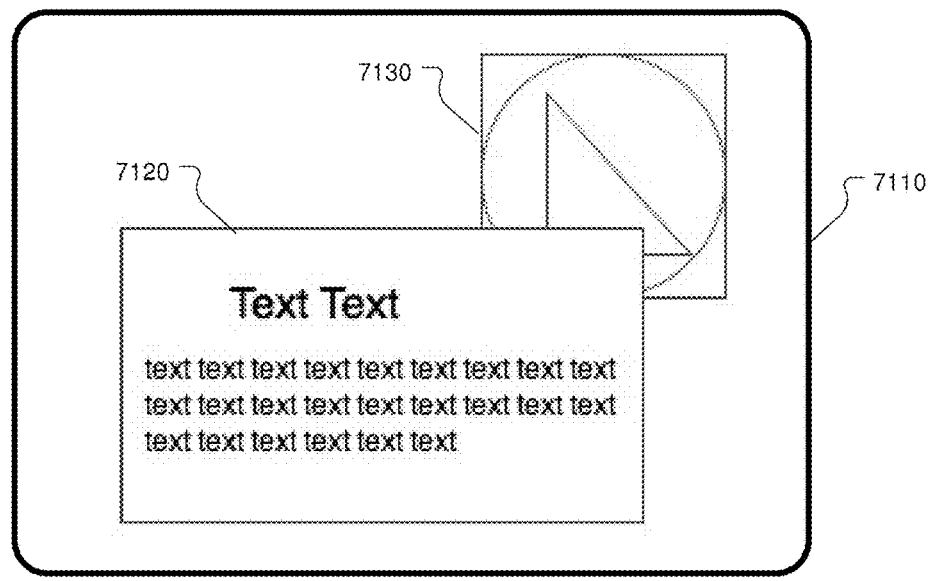

FIGS. 7A and 7B depict the identification of an authorized third party in a region behind the user of a computer and the maintenance of an unobscured display in response to such identification. FIG. 7A illustrates the appearance of the authorized third party in the field of view of the image sensor. FIG. 7B illustrates the unobscured display.

Figure 8A:
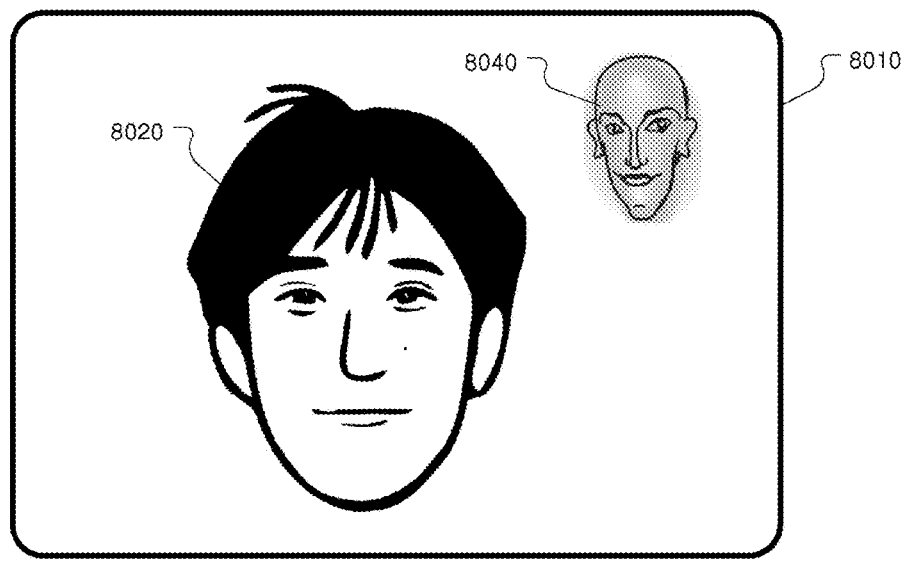
Figure 8B:
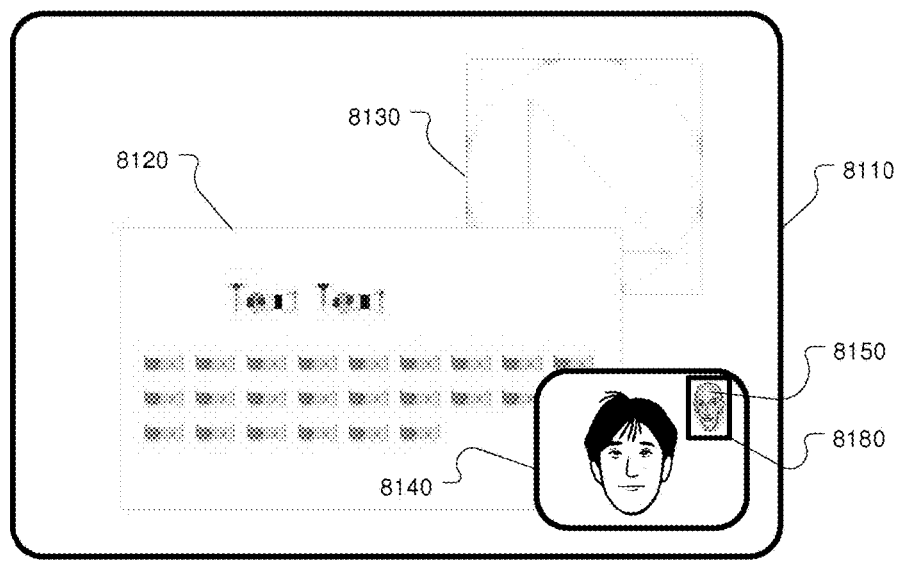

FIGS. 8A and 8B depict the identification of an unauthorized third party in a region behind the user of a computer and the provision of an obscured display in response to such identification. FIG. 8A illustrates the appearance of the authorized third party in the field of view of the image sensor. FIG. 8B illustrates the obscured display, including a warning window alerting the user to the presence of the unauthorized "shoulder surfer".

Figure 9:
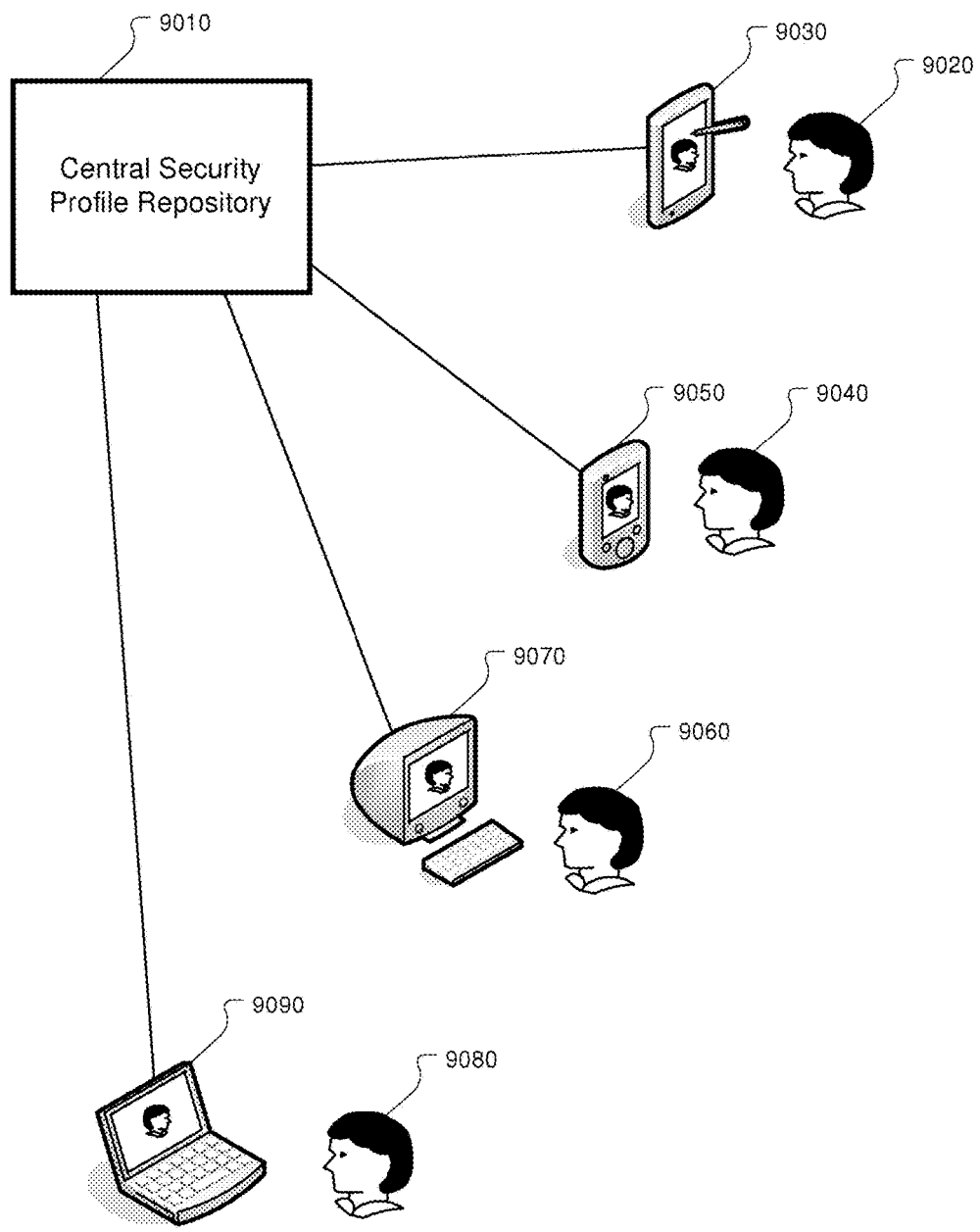

FIG. 9 depicts a diagram illustrating the centralized security profile repository and access therefrom by a user from a plurality of devices and locations.

Figure 10:
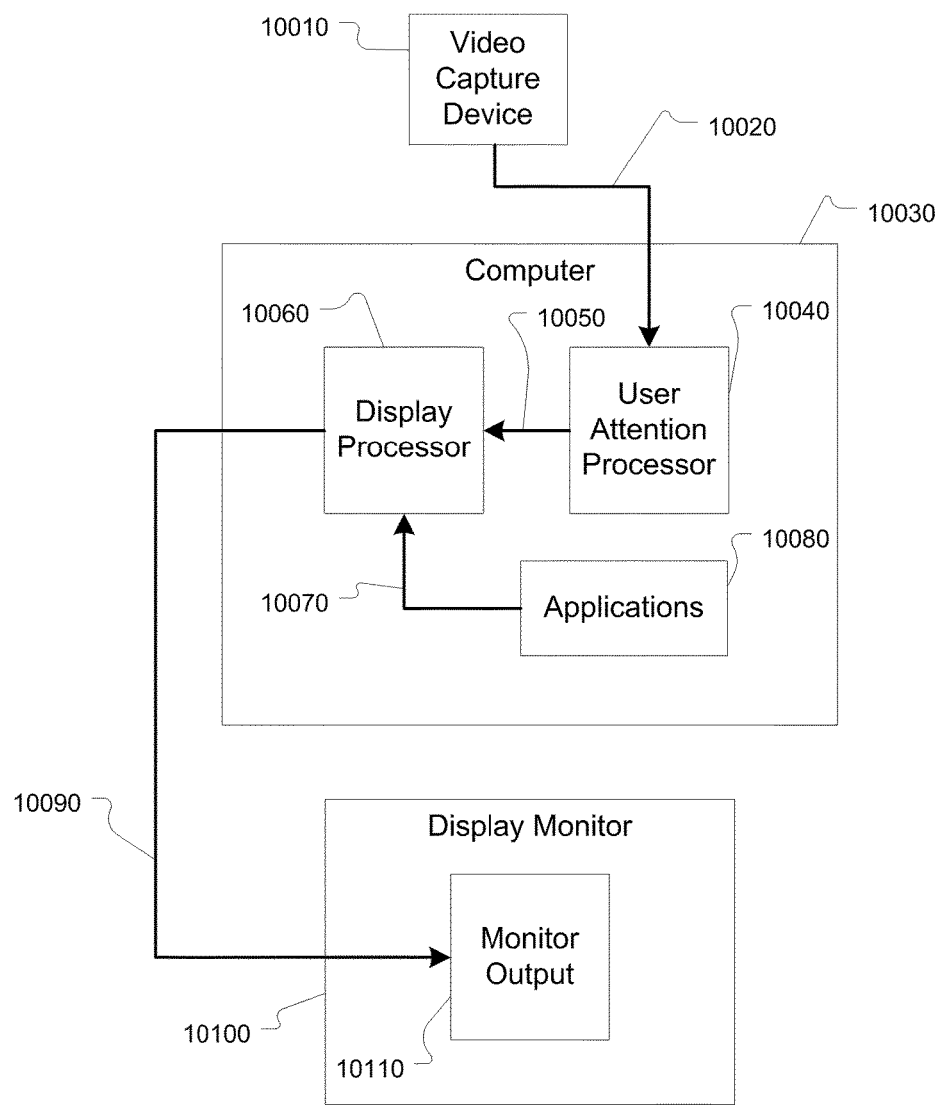

FIG. 10 depicts a schematic diagram of an exemplary embodiment with user attention processor located in a computing device.

Figure 11:
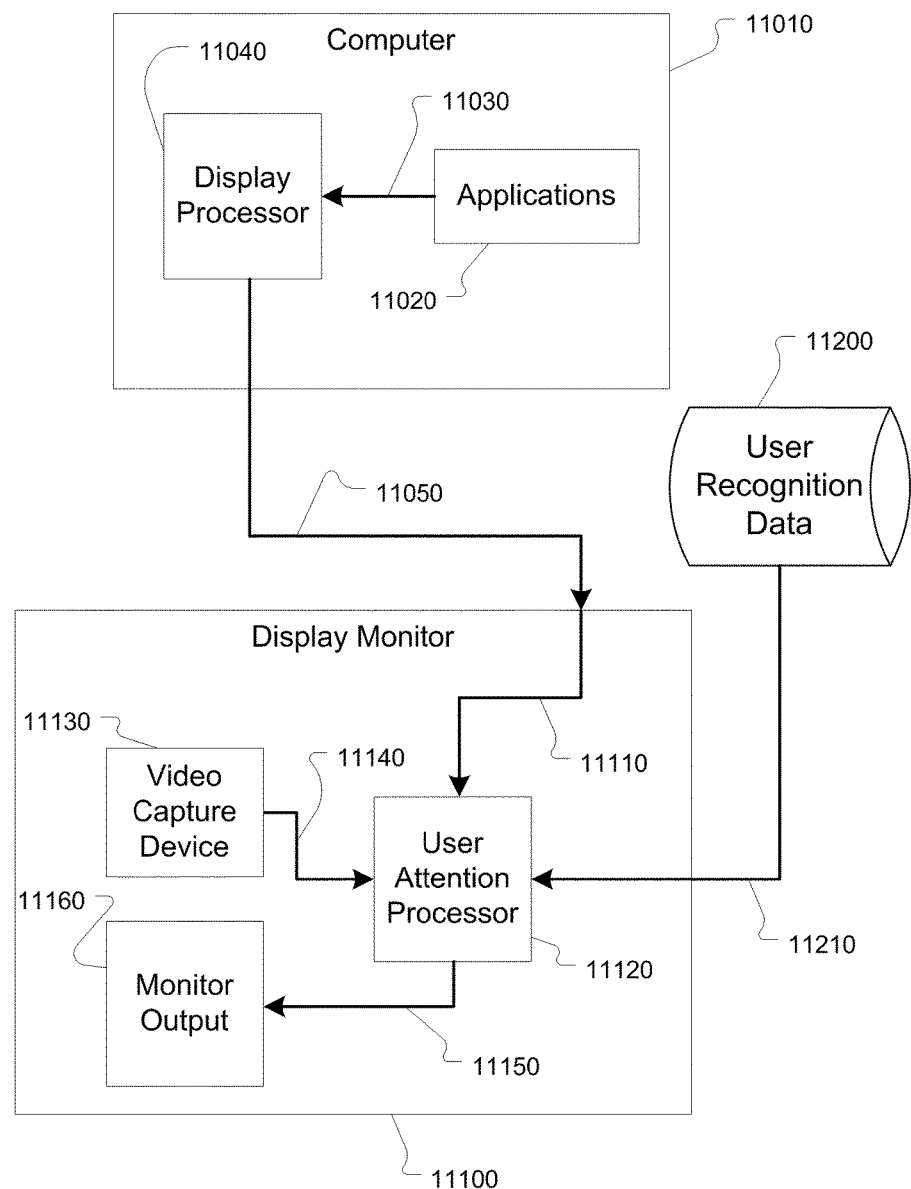

FIG. 11 depicts a schematic diagram of an exemplary embodiment with user attention processor located in a display device.

Figure 12:
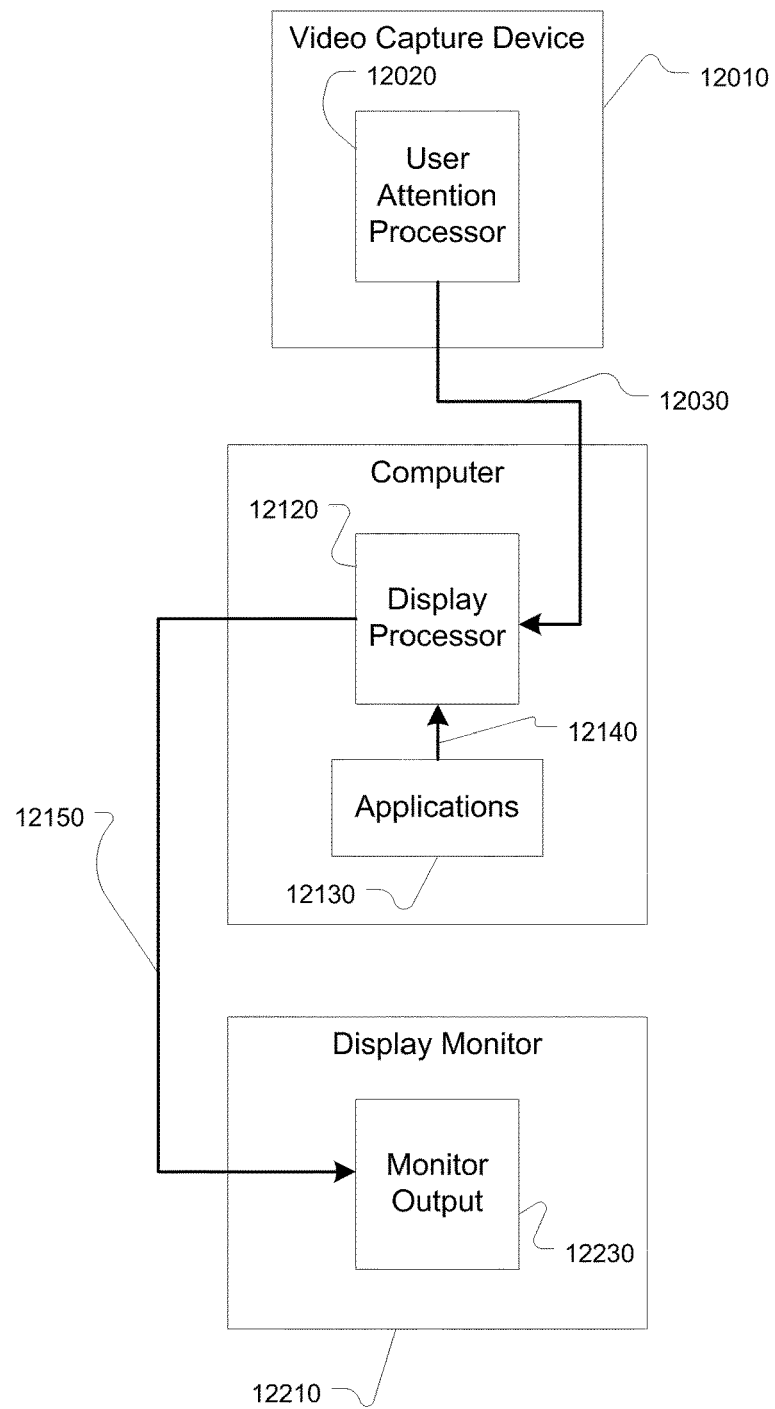

FIG. 12 depicts a schematic diagram of an exemplary embodiment with user attention processor located in a video capture device.

Figure 13:
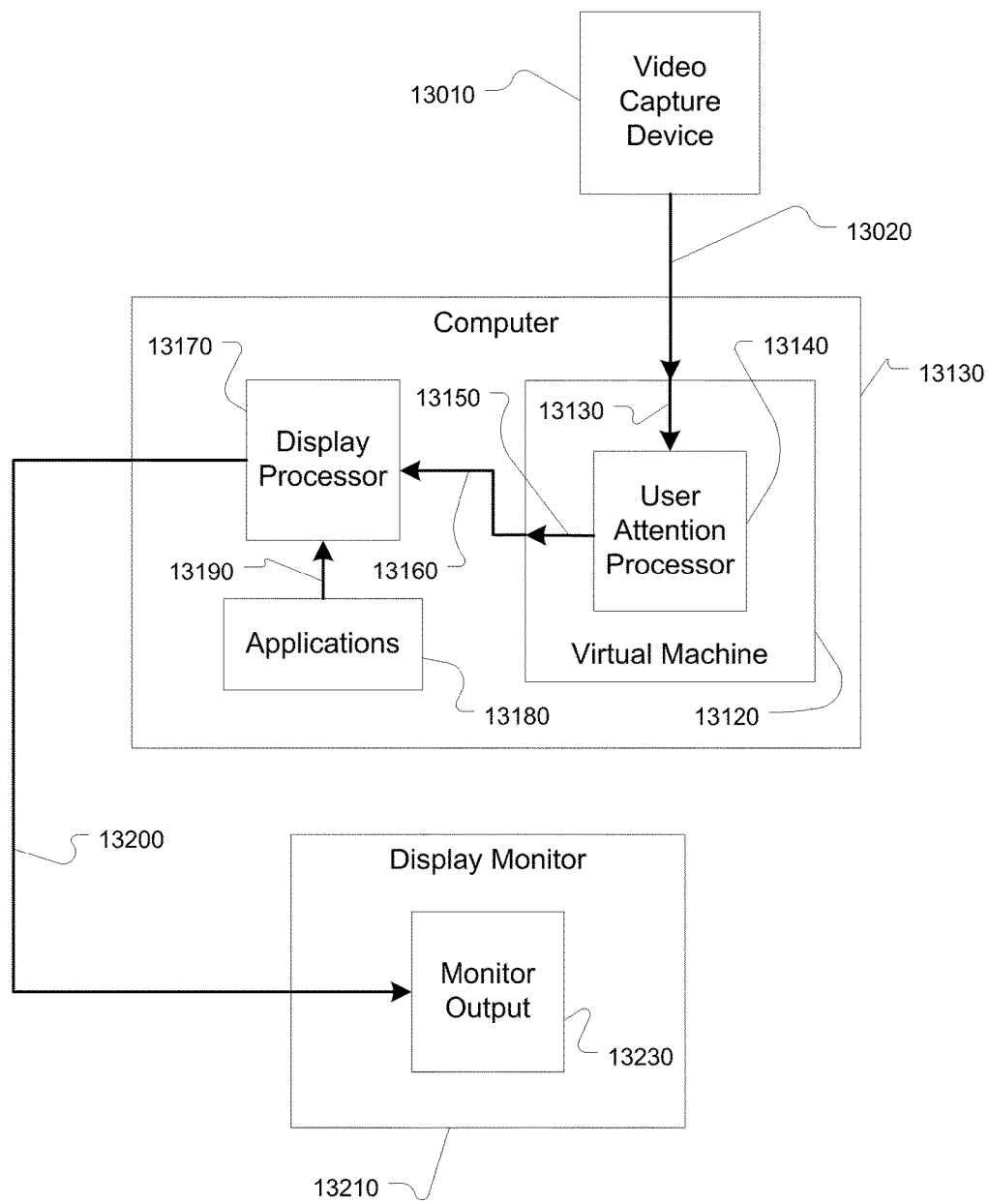

FIG. 13 depicts a schematic diagram of an exemplary embodiment with user attention processor located in a virtual machine instantiated in a computing device.

Figure 14:
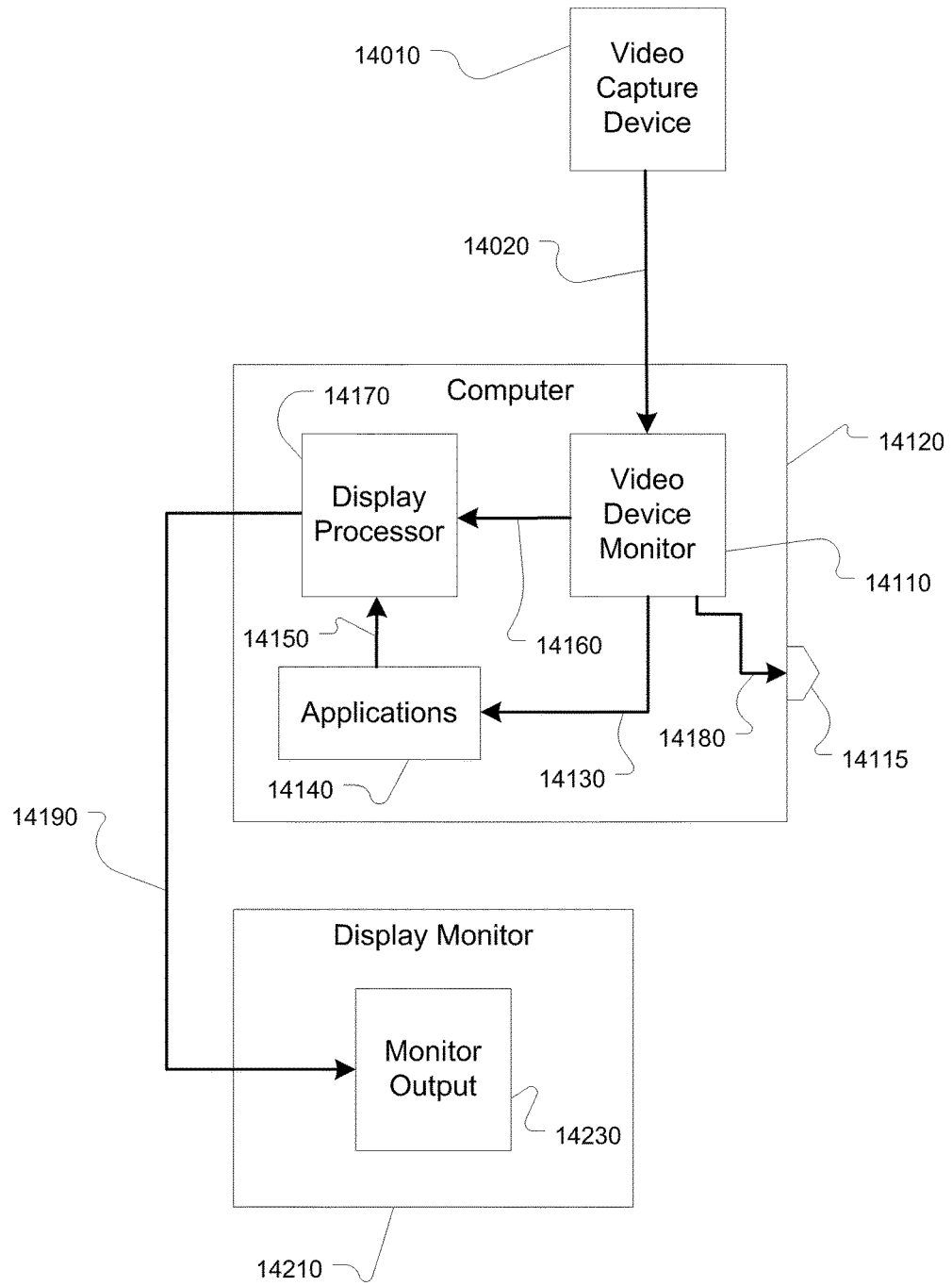

FIG. 14 depicts a schematic diagram of an exemplary embodiment that comprises video device monitor and alerting components.

Figure 15:
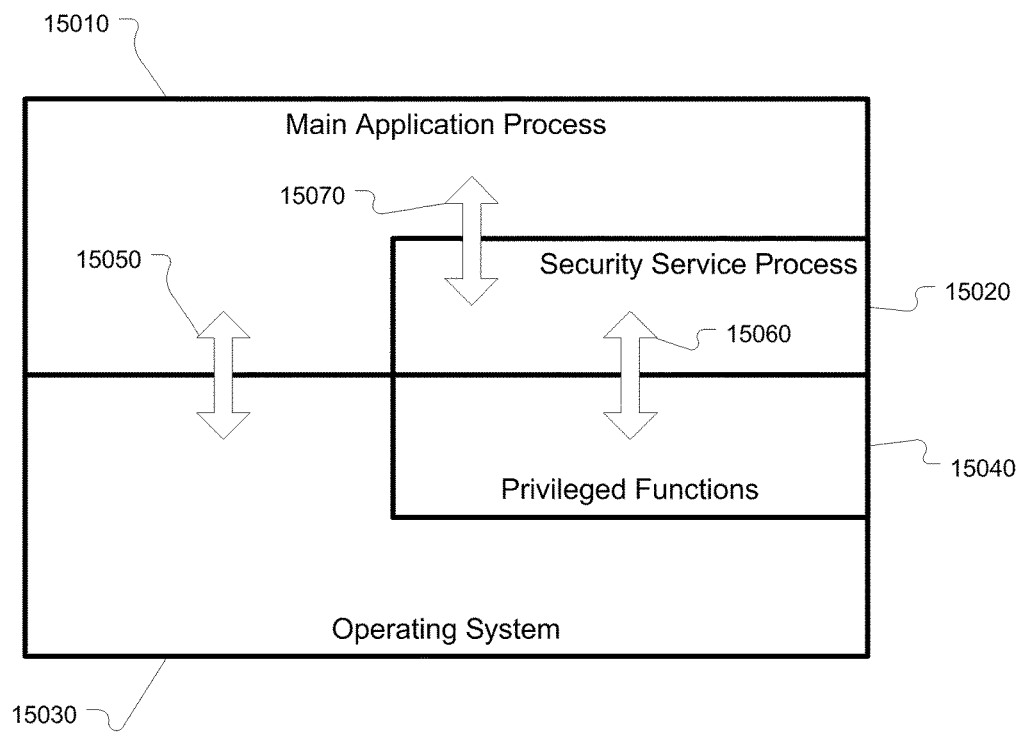

FIG. 15 depicts a schematic diagram of the interface paths between an exemplary embodiment's main and security service processes and an operating system and its privileged functions.

Figure 16:
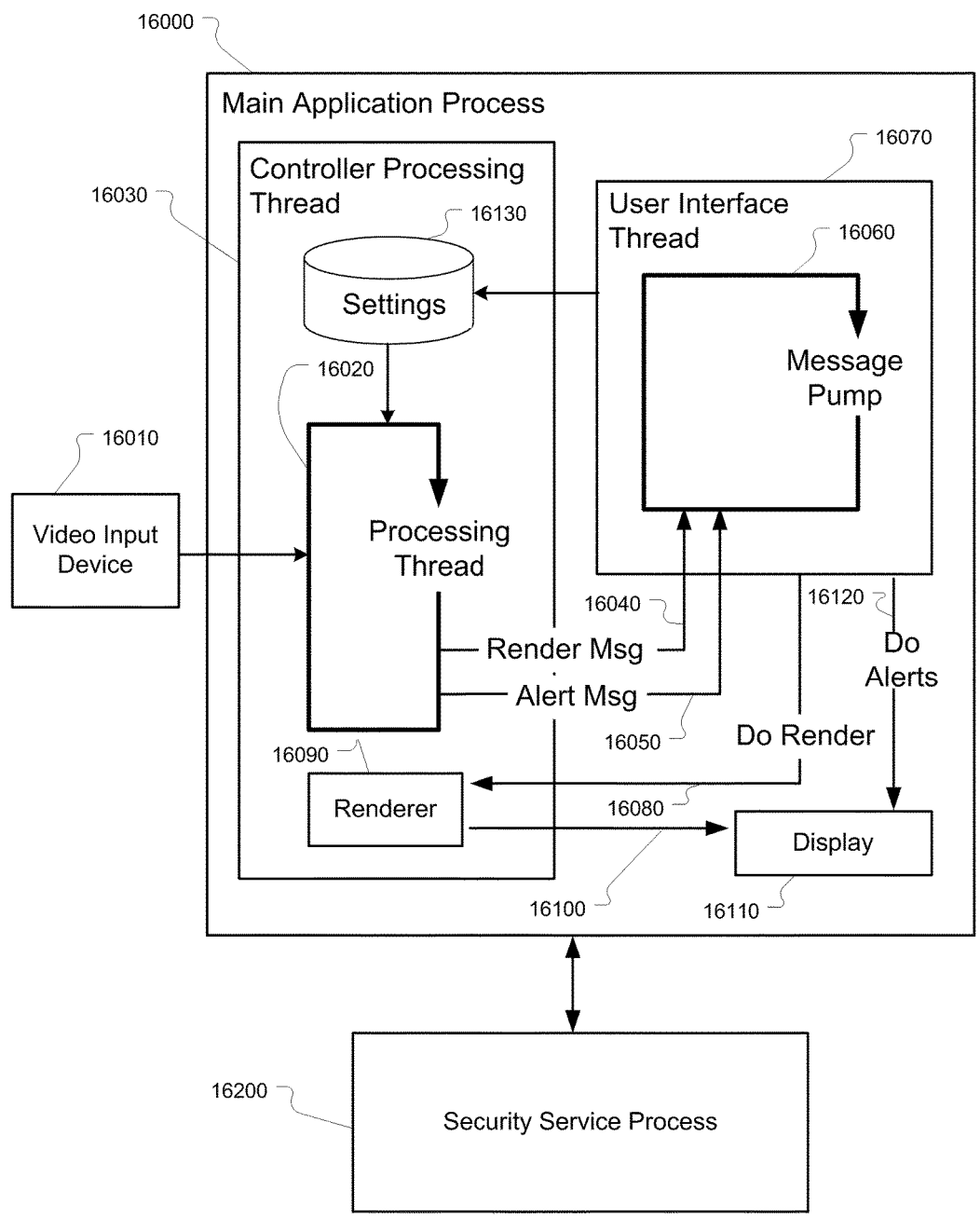

FIG. 16 depicts a schematic diagram of an exemplary embodiment's controller processing thread, user interface thread, and some components, such as a renderer, display and security service process.

Figure 17:
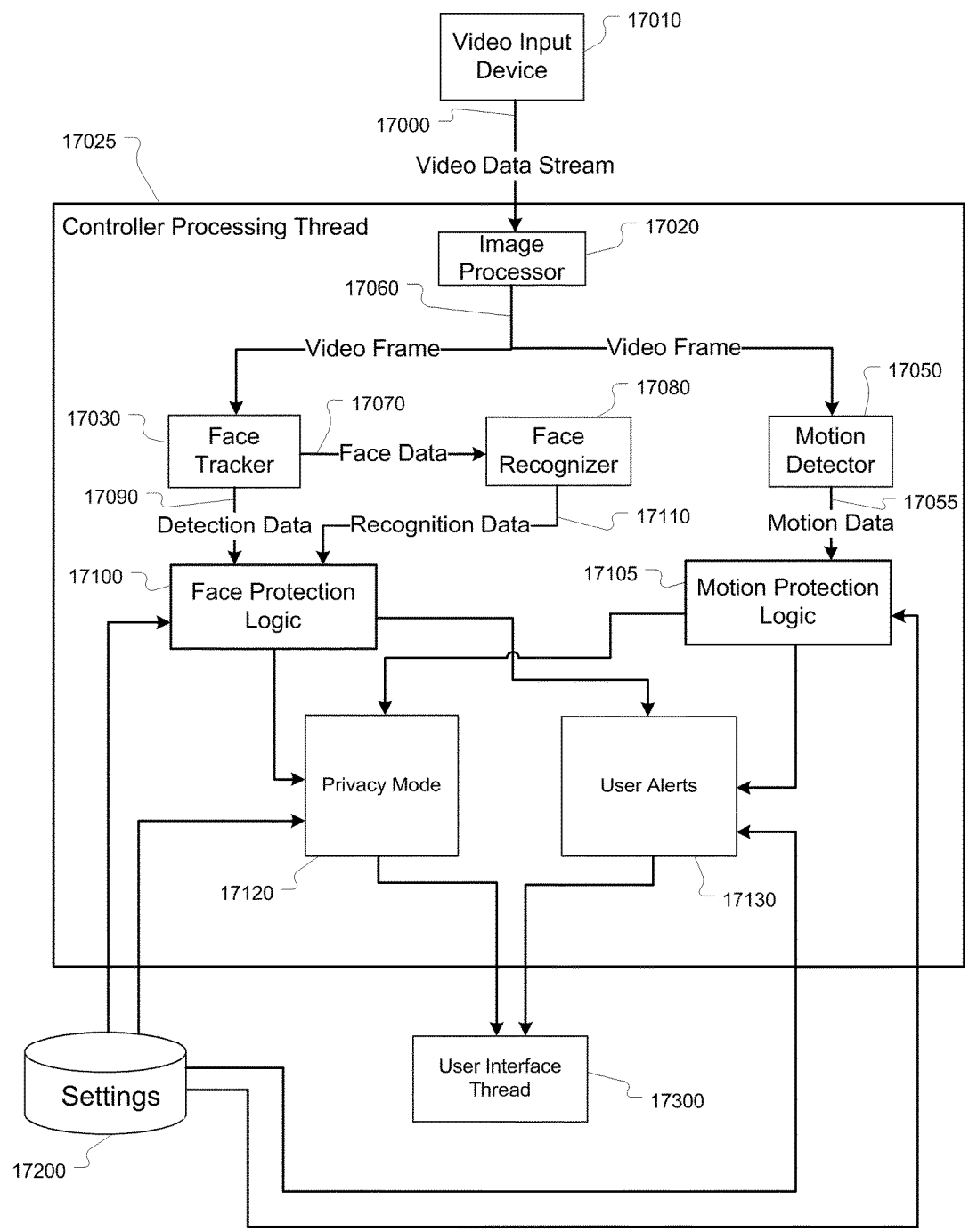

FIG. 17 depicts a schematic diagram of some of the components of an exemplary embodiment's controller processing thread, and some of the data flows between them.

6 DESCRIPTION OF SOME EMBODIMENTS OF THE INVENTION

6.1 Overview

The present invention provides systems, software, and methods to maintain privacy of displayed data by using sensor-derived information about the user or other authorized individuals, the device's environment, the user's interaction with the device, and the user's attention to displayed information to detect, and optionally to identify, the user, optionally authorize device use and information display, detect and notify the user of unauthorized viewers or recording devices, inhibit unauthorized viewers, and to reduce the amount of displayed information available to unauthorized persons or devices. The sensor-derived information is also used, in some embodiments, to detect unauthorized movement of the device, to record or transmit information (or both) about the device location, environment and person or persons in the vicinity of the device. These capabilities are, in some exemplary embodiments, implemented in such a way as to support centralized security policies and enforcement of these, with audit data maintained to permit later analysis of adherence to them. In addition, exemplary embodiments comprise aspects that can be used to reduce concerns involving the presence of video or other sensor input devices in secure locations by confining use of such devices to permitted purposes or making activation of such devices apparent (or both) and preventing stealthy use of them. The software and methods provided by the invention can be implemented in computing devices, display devices, sensor devices, virtual machines, or in any other device or system possessing the required capabilities for sensor input, sensor data processing, display control or device management, or both, by those having ordinary skill in the art using the description and drawings herein.

The various embodiments of the current invention use one or more sensors, such as video cameras, infrared cameras, sonar, radar and lidar systems, gaze trackers, or other appropriate sensor systems in conjunction with appropriate processing software to monitor the area from which the display is visible and to determine whether an authorized user or unauthorized individual is looking at the display. In some exemplary embodiments, any face-like object is treated as an authorized user. As used herein, a "face-like object" is any sensor input that possesses characteristics that cause facial recognition software to determine that a face is within the detection range of the sensor. In some embodiments, identification of the face-like object as belonging to a particular individual is performed. In other embodiments actual recognition is not performed, and the general detection of a "face" is sufficient. In other exemplary embodiments the system is configured to recognize one or more specific individuals as authorized users, and to treat all others as unauthorized. In yet other exemplary embodiments the system can support a plurality of authorization security levels, and recognize one or more of these as applying to specific recognized individuals, while other specific recognized individuals are recognized as being associated with alternative one or more authorization security levels. Still other exemplary embodiments can assign unrecognized individuals to one or more security levels based on such characteristics as distance from the display, direction faced, or history of recognition. The implementation of such hardware and software on a computer device will be apparent to those having ordinary skill in the art.

Figure 1:
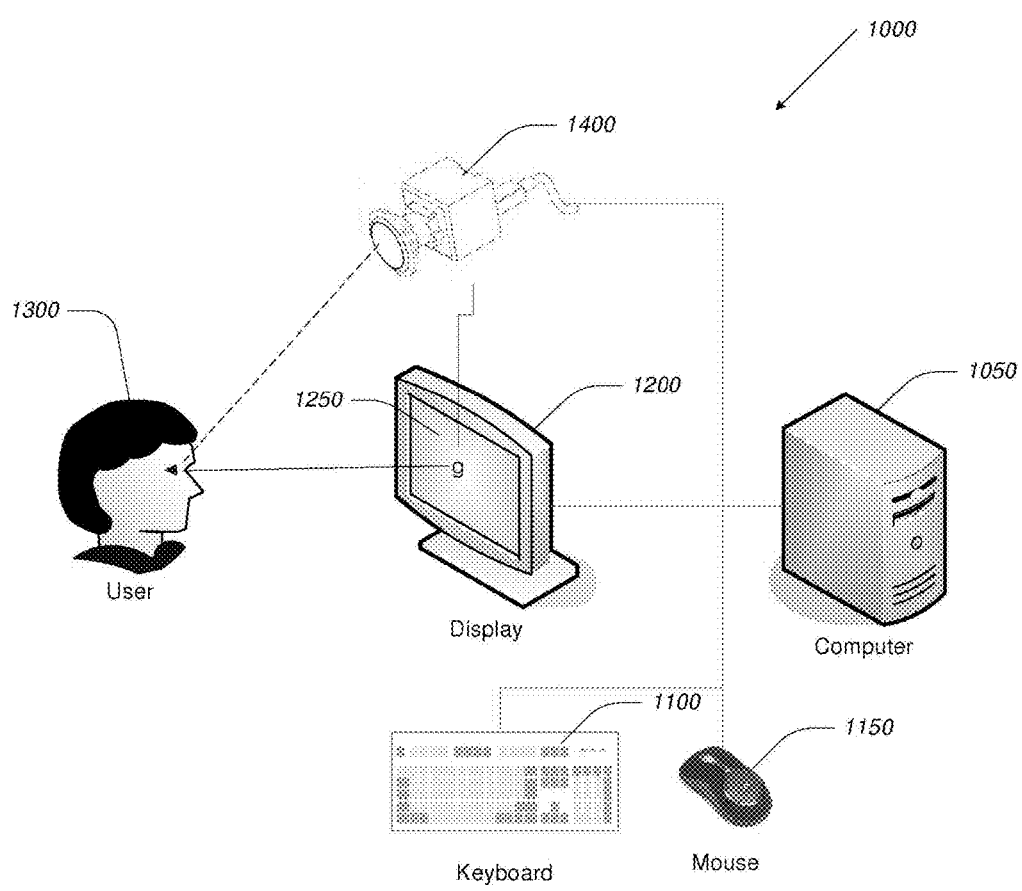
FIG. 1 is a block diagram of the components of an exemplary embodiment of the present invention for providing content privacy for a single authorized user with an image sensor, such as a webcam or gaze tracker, in accordance with one embodiment of the present invention.

A first exemplary embodiment of a system in accordance with the present invention, depicted in FIG. 1 at 1000, includes a computer-driven display system (1200) for presenting visual information securely to a viewer. The exemplary system (1000) includes a computer (1050) in electronic communication with input devices such as a keyboard (1100) and mouse (1150). Computer 1050 is electronically coupled with a display device (1200) including a viewing surface or display (1250) that is viewed by a user (1300) whose ability to view intelligibly content displayed on the display at a gaze point "g", as determined in part using an image sensor (1400), such as a camera (e.g., a "webcam") or a dedicated gaze tracker, electronically coupled with a security processor (not shown), which security processor is further in communication with a user security parameter database (not shown), is controlled as described herein. Each of these elements is of standard design and construction, and will be familiar to those having ordinary skill in the art using the present disclosure and drawings.

Figure 2:
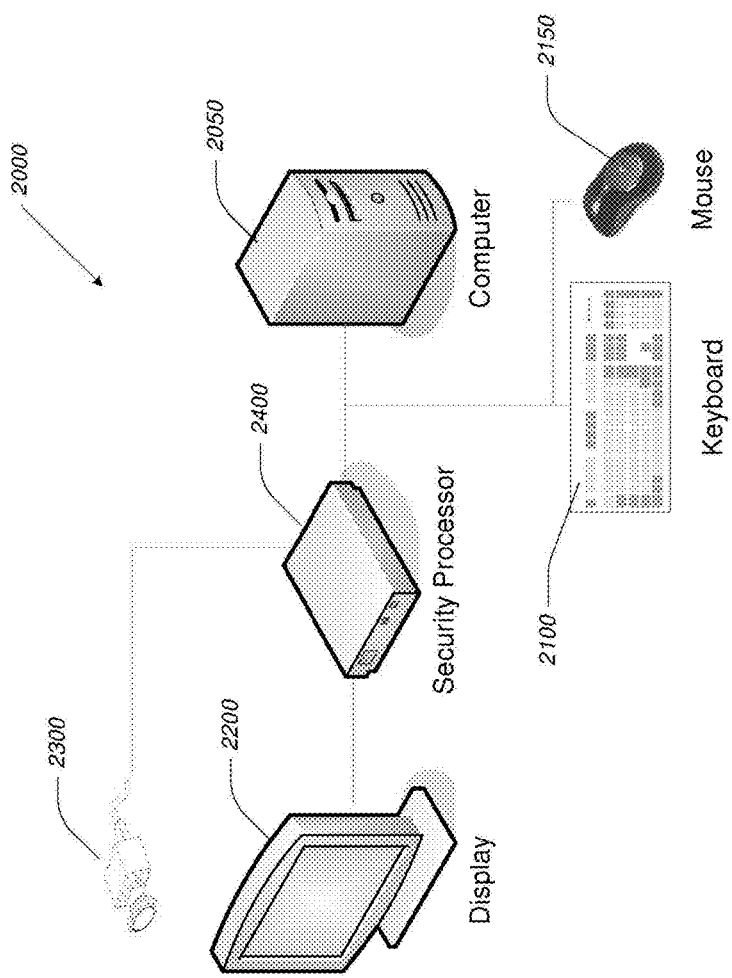
FIG. 2 is a block diagram of the components for an alternate exemplary embodiment of the present invention for providing content privacy including a special purpose security processor in accordance with one embodiment of the present invention.

FIG. 2 depicts an alternate embodiment of a system in accordance with the present invention (2000) including a computer (2050) in electronic communication with input devices such as a keyboard (2100) and mouse (2150), that is electronically coupled with one or more display devices (2200) and an image sensor (2300) substantially as described in FIG. 1. However, in the illustrated system, electronic communication between the computer 2000, display 2200, and image sensor 2300 is controlled by a dedicated Security Processor (2400) that performs at least some of the operations described herein rather than by the computer. In a more particular embodiment of the illustrated system of FIG. 2, the display terminal is an X-terminal electronically connected to the computer using a network, over which display management commands and content are passed. The security processor is implemented in the computer or within the X-terminal itself. The protocols utilized by the X windowing system are familiar to those having ordinary skill in the art. Alternate embodiments include remote terminal communications applications such as the Windows Remote Desktop Connection, VNC, and Citrix. Each of these applications support communications with the computer using protocols well-understood by those having ordinary skill in the art.

Those having ordinary skill in the art will understand that the systems illustrated in FIGS. 1 and 2 encompass systems in which the illustrated connections are physical (e.g., by direct cable connection) and logical (i.e., the connections are either remote, such as over a network connection in a client-server type arrangement, or through wireless connections). These systems include standard "desktop" type multipurpose computer systems, such as provided by personal computers, specialized computer systems, such as found commonly in government, scientific, engineering, and military applications, and consumer electronic devices including, but not limited to, music players, such as MP3 playback devices, picture and video players (e.g., DVD, Blu-Ray, JPEG display devices), cell phones, personal digital assistants, and the like. As will be apparent to those having ordinary skill in the art, the systems, apparatuses, software, and methods, provided by the present invention can be adapted to any device that is capable of displaying information under computer control using the disclosure herein.

Referring to the elements of both FIGS. 1 and 2, the details and operation of which are described in greater detail below, in some embodiments the image sensor device is further configured to communicate facial recognition data to a security processor. As used herein, "facial recognition data" includes data sufficient to identify a particular individual's face as well as more general data useful to recognize the actions of an individual (e.g., looking at a display or away from a display) without determining the user's identity. The user security parameter database encodes security parameters associated with the user. The database is also configured to communicate with the security processor. The security parameter database can be of any configuration suitable to perform the functions described herein, such as, but not limited to, a central database or two or more databases that are synchronized. The security processor is configured to receive the facial recognition data and the security parameters associated with the user, and is further configured to at least partially control the operation of the data input device and the data output device in response to the facial recognition data and the security parameters associated with the user. Among the latter embodiments are more particular embodiments in which the facial recognition data includes image data relevant to determining the presence of a third party in a region from which the displayed data can be view, such as a region behind the user. Among those embodiments are those in which the security processor is configured to provide a warning (such as a display or audible notice) upon detecting the presence of a third party in the region, which warning, in yet more particular embodiments, comprises an image of the third party. In other embodiments in which the security processor is configured to display a warning upon detecting the presence of a third party in the region, the security processor is configured to modify the operation of the video display upon detecting the presence of a third party in the region. In still other embodiments in which the security processor is configured to display a warning upon detecting the presence of a third party in the region, the system of the invention includes a microphone for collecting sounds from the user, and the security processor is configured to modify the operation of the microphone upon detecting the presence of a third party in the region.

In other embodiments in which the system includes a video display, the image sensor device is further configured to track the user's gaze on the display, and the security processor is configured to modify the operation of the video display upon detecting that the user's gaze is not on the video display. In other such embodiments, the system includes a microphone for collecting sounds from the user, and the security processor is configured to modify the operation of the microphone upon detecting the presence that the user's gaze is not on the video display.

In still other embodiments, the user security parameter database is at a location remote from the computer.

6.2 User Authentication

In some embodiments, the software, systems, and methods provided by the present invention provide one or more security levels. Each security level can be associated with particular responses and behaviors of the systems of the current invention when a user having a given security level is either detected or not detected by the system (e.g., by the image sensor described above). Responses and behaviors comprise such things as obscuring some or all of the display, substituting display content for alternative content, muting microphone or speakers (or both), making audit log entries, interaction with network services, such as security databases or intrusion detection systems, or other behaviors as will be known to those with skill in the art. In some exemplary embodiments, the behavior chosen can depend on a plurality of factors being present simultaneously, such as detection of device movement combined with lack of detection of an authorized user. In some exemplary embodiments a plurality of behaviors can be associated with a specified set of factors, such as video data being transmitted to a specified server, audit log entries being made, screen data being obscured, and sensitive data being erased. Instituting such responses and behaviors, and the detection and identification of users can be done by those having ordinary skill in the art using the disclosure and drawings herein.

Exemplary embodiments of the current invention can use various sensors, such as video input devices (e.g., "webcams"), to detect and identify specific individuals using techniques such as face recognition. Once a face-like object is detected, exemplary embodiments can attempt to identify the face-like object as a specific user by means of feature extraction (e.g., face shape, face size, skin color, eye color, eyebrows, eye shape, nose shape, mouth shape, hair color, glasses, estimated angle of face to the screen, etc.) and comparison with a file, database or other secure information source containing identification information for one or more users. Other exemplary embodiments can use image matching, comparing the face-like object to stored images of known users until a match is found, or the face-like object is determined to be unrecognized. Recognition of individuals by means of face recognition can be combined with additional authentication means, such as passwords, shared tokens, biometrics or other well known techniques, or used alone. Gestures can also be used to verify the identity of a given user, either alone, or in conjunction with face recognition or other verification methods. Instituting the foregoing can be done by those having ordinary skill in the art using the disclosure and drawings herein.

In some exemplary embodiments of the current invention face recognition is used as a primary means to identify a user, after which the user enters a password, gesture sequence, biometric input, or other required verification to confirm access to the account associated with the recognized face. In some other exemplary embodiments, the user enters account information, such as a username, biometric device input, or other account specification, and facial recognition is used as a secondary factor to verify access to the account determined by the non-facial recognition inputs. In yet other exemplary embodiments, facial recognition is not a factor in authentication for access. Whether facial recognition is used to authenticate initial access to the device in a given embodiment, facial recognition can still be used to verify continued presence of an authorized individual at the device as required to maintain privacy of displayed information. Instituting the foregoing can be done by those having ordinary skill in the art using the disclosure and drawings herein.

FIGS. 3A-3C are diagrams representing an exemplary authentication by an embodiment of the current invention. Referring to FIG. 3A, the video input (3010) provided by a video input device or image sensor (not shown), comprises a face-like object (3020). In some exemplary embodiments, the face-like object is analyzed and compared to the faces of known individuals in order to perform facial recognition and identify the individual in front of the video input device. In the exemplary authentication scenario, the current user (3240) has been tentatively identified as "Joe User", and his username has been automatically read from the user database entry (3210), shown in FIG. 3C, and entered into the "Username:" input field (3120) of the login display (3110) shown in FIG. 3B, since the exemplary embodiment in this example is using the facial recognition as a primary means of authentication for convenience. The user must still enter a password into the password field of the login display (3140, FIG. 3B) to confirm his identity and be granted access as the current user. If the face recognition software has failed to properly recognize the user and had selected "Mary User" (3220) or some other user (3230), Joe User can enter the correct username manually. Instituting the foregoing can be done by those having ordinary skill in the art using the disclosure and drawings herein.

Referring again to FIG. 3A, in some exemplary embodiments, gestures can be used as a form of authentication, whether instead of, or in addition to, more traditional forms of multi-factor authentication, such as passwords, token keys, biometric data, or smartcards. This is represented in FIG. 3 by the hand gesture, where the user moves his left hand from a starting position (3030) to an ending position (3050) along a particular path (3040). Gestures can be arbitrarily complex, involve one or both hands, specific finger positions, relationships to the face, facial expressions such as frowns, smiles, winks, or head tilts, or combinations of these or any other user behaviors that are detectable by the available sensors. For example a gesture could be made up of a hand gesture in a specific location relative to the face, such as a right handed salute, in combination with the right eye being closed, and the left shift key being depressed while the user says, "Joe" into the microphone. Instituting the foregoing can be done by those having ordinary skill in the art using the disclosure and drawings herein.

Referring again to FIG. 3C, successful authentication grants access to the device with the security level assigned to the identified user, and makes the user the "current user" (3240) for purposes of determining the presence of a current user at the display. In some exemplary embodiments, this authentication must be repeated to restore access to the device after a period during which the user was away from the device. In other exemplary embodiments the user must only be recognized by facial recognition as the current user to restore access. In still other exemplary embodiments, the facial recognition must be supplemented by at least a portion of the additional authentication factors, such as re-entry of the password, or repetition of the gesture sequence. In yet other exemplary embodiments a repetition of the entire authentication procedure is required to restore access. In some exemplary embodiments, re-authentication is only required if the user was away from the device beyond a specified time period, similar to the way that screen savers function, and if the user returns within that time period, simple recognition of a face-like object, or facial recognition of the user, is sufficient to restore access. In some exemplary embodiments the settings for authentication methods, time periods involved, and re-authentication requirements are set through a centralized security policy, and the ability of the device user to alter these can be limited or prohibited. In still other embodiments, the rules for authentication and re-authentication are defined in terms of a useful parameter, such as the time of day, or an analysis of the visual environment which the sensor can detect. For example and without limitation, some environments are identified by a set of features visible to the sensor, and upon detecting such environments the system adopts a particular pre-defined security posture. Instituting the foregoing can be done by those having ordinary skill in the art using the disclosure and drawings herein.

In some exemplary embodiments, a check is made at intervals to verify current user identity and continued presence, such as by performing face recognition. The intervals can be kept short, such as several times a second, or done at longer intervals, such as once a minute or more. Shorter intervals permit assumption that an unrecognized face-like object that is located in the position occupied by a recognized user on the previous check is still the recognized user, since there would not have been time for the user to have moved away between checks. Changes in lighting, user position, video input device view angle, and others can alter the appearance of the current user over time, and can cause a previously recognized user to become unrecognizable, such as in those embodiments using image matching rather than feature extraction techniques. If the security policy in use permits it, the assumption that the user could not have departed between re-checks can be used to permit updating of the user's saved appearance in an automatic fashion, and avoid requiring the current user to re-enter authentication information, such as passwords, tokens or other information. In some exemplary embodiments, additional data can be used to support the assumption that the currently seen user is the same user that was verified previously, such as keystroke data showing that the current user has been typing continuously since the last time he was recognized, or that the pointing device has been moving continuously, or that other sensors, such as sonar, radar or others have detected no movement of the user away from the device. To conserve storage space for tracking the plurality of user images that results from automatic re-captures of user image data, a First-In-First-Out (FIFO) method can be used to delete the oldest images to make space for newer image captures. In other embodiments other methods of managing user image storage are used, such as Least-Recently-Used (LRU) deletion to discard images that haven't matched the user's actual appearance recently, Least-Often-Used (LOU) deletion to discard images that don't match the user's appearance very often, or other methods as will be known to those having skill in the art. Still other arrangements, methods, and designs will be familiar to those having ordinary skill in the art.

Given the sometimes poor resolution of video capture devices and often inadequate lighting of many portable device use locations, it is likely that many image captures will not contain recognizable images of known users, even when such are present in the view of the image capture device. To deal with this, exemplary embodiments can combine the results of a number of captures into a single "recognition" value. For example, if 51% or more of the captured frames match a given user, the user is presumed to have been recognized, even through up to 49% of the captured frames did not contain a recognizable image of the user. The specific threshold value can be a configurable setting, and controlled by a security policy setting in some exemplary embodiments. Some alternative embodiments can attempt to increase the match ratio by adjusting configuration settings, such as video capture device sensitivity or contrast settings, screen brightness, or other relevant settings. Instituting the foregoing can be done by those having ordinary skill in the art using the disclosure and drawings herein.

6.3 Calibration Using User Feedback

Some exemplary embodiments employ sensors with the ability to determine not only that a user is present and facing a display, but also what part of the display the user is looking at. Such devices are referred to herein as "gaze trackers". Such devices are commercially available and designed specifically for this purpose, but in some exemplary embodiments it can also be possible to use less specialized devices, such as video input devices (e.g., webcams), to perform a similar function. Regardless of whether a device is a specially designed gaze tracker, or a video input device being used to determine where a user is looking (the user's "attention point"), calibration of the device to a particular user can enhance accuracy. Other exemplary embodiments employ sensors to determine whether the user's attention is likely focused on the display without necessarily determining the exact location of the user's gaze. Instituting the foregoing can be done by those having ordinary skill in the art using the disclosure and drawings herein.

FIG. 4 is a diagram of an exemplary calibration display (4010), showing a set of exemplary "gaze targets" (4020, 4030, 4040, and 4050). The user is requested to look at each target, whether in a prescribed sequence or at the user's discretion, and the exemplary embodiment associates sensor device inputs with each gaze target. From these readings, interpolation can be used to determine the attention point for other display locations. The number of gaze targets used, their locations on the display, whether they are displayed simultaneously or not, and other factors can vary with the specific embodiment, sensor device used, or specific user, as needed to achieve the desired accuracy. In some exemplary embodiments the gaze targets are not displayed at fixed locations, but are moved across the display and the user requested to track the location along the movement path. This is represented by the moving gaze target that starts at a first position (4060) and travels along a curving path (4070) to a final position (4080). Such moving gaze targets permit collection of data from a greater portion of the display area in a given time than do a sequence of statically positioned gaze targets. In yet other exemplary embodiments the calibration is controlled by the user rather than the exemplary embodiment. The current calculated user attention point is displayed by the system of the invention, and the user manually adjusts the location to correspond with the users actual attention point by use of a pointing device, such as a mouse, light pen, or trackball, or by keyboard input, spoken directions or other means of user input supported by the particular computing device. Such adjustments can be performed at one or a plurality of points on the display device that are selected by the user's choice of where to look on the display. The calibration data collected in this way are then used to perform adjustments of all attention points estimated by the system through interpolating the appropriate offsets to use for points lying between the manually calibrated points. Instituting the foregoing can be done by those having ordinary skill in the art using the disclosure and drawings herein.

In some exemplary embodiments, calibration of attention point determination is not performed in a separate calibration procedure as described above, but is done as the user interacts normally with the device. In some embodiments, certain assumptions are made about user behavior to facilitate such calibration procedures. In one embodiment, one assumption is that a user will be looking at a pointing device cursor, such as a mouse pointer, a stylus, a touch screen tap location, or other input device or method, while the pointing device is in use. If the sensor-determined attention point differs significantly from the pointing device cursor location, then the sensor-determined attention point is probably in error, and a calibration correction should be made to bring it into congruence with the pointing device cursor location. In another embodiment, text insertion cursors are assumed to be the user's visual focal points, and compensation is made for the possibility that the user may not actually be looking at the screen, but touch-typing while looking at a document elsewhere. Only if the user is facing the display should an assumption be made that the text cursor is a likely indication of user attention point and any discrepancies be resolved by calibration of the attention point. Instituting the foregoing can be done by those having ordinary skill in the art using the disclosure and drawings herein.

FIG. 5 is an exemplary illustration showing a display (5010) of text being entered by a user (5020). The attention point of the user has been determined to be at the position indicated by the gaze target (5030), which is included only for purposes of illustration, and would not necessarily appear on an actual display. The text insertion cursor location (5040) is at a small distance from the determined attention point (5030). If the user is looking at the screen, the difference between the text cursor (5040) and attention point (5030) locations is possibly an error, and should be corrected by calibration of the attention point. In some exemplary embodiments, a single error detection of this sort is not grounds for calibration of attention point, and a series of such determinations is required, by following the text cursor over several lines of entered text for example, before concluding that the attention point determination is out of calibration. In some exemplary embodiments a combination of methods are used to calibrate attention point determination, such as by using both text and pointing device methods, or by using other methods, such as assuming that the user is looking at the text insertion point immediately after the user's face turns back to the display. Instituting the foregoing can be done by those having ordinary skill in the art using the disclosure and drawings herein.

6.4 Attention Recognition and Privacy Mode Activation

The present invention also provides methods and associated software for execution on a computer for regulating the interaction between a computer and a user of the computer based on the environment of the computer and the user. In some embodiments, described in greater detail below, the methods comprise obtaining facial recognition data from an image sensor device configured to collect facial recognition data and communicating the facial recognition data to a security processor. The security processor also receives user security parameters from a user security parameter database including data encoding security parameters associated with the user at the security processor. Using this input among other parameters the security processor at least partially controls the operation of at least one of a data input device and a data output device connected with the computer in response to the facial recognition data and the security parameters associated with the user. In other embodiments, the foregoing method includes detecting the presence of a third party in a region extending behind the user. Still other embodiments include providing a warning to the user in response to detecting the presence of a third party in the region, or modifying the operation of at least one of a video display device or a microphone connected to the computer, or any combination thereof, in response to detecting the presence of a third party in the region. Other embodiments of the methods provided by the invention include detecting that the user's gaze has moved away from a video display device connected with the computer, and in more particular embodiments, providing a warning to the user in response to the detecting the presence of a third party in the region, or modifying the operation of at least one of a video display device or a microphone connected to the computer, or any combination thereof, in response to the detecting the presence of a third party in the region. Instituting the foregoing can be done by those having ordinary skill in the art using the disclosure and drawings herein.

In some embodiments, the system determines whether the user is looking directly at the device display, looking at the display at an angle, or looking away from the display. Users tend to look away from the display periodically while working, for example to look at the keyboard, reach for a pointing device, refer to nearby materials or to answer a phone. Exemplary embodiments of the current invention can determine the current user's attention point, and to use this information to enhance the privacy of the data displayed by obscuring, removing, or otherwise making it unavailable when the attention point is determined to be other than on the display, i.e., when the current user is not looking at it. Exemplary embodiments can allow, for example, a touch-typist to work from an off-display source while obscuring the display so that unauthorized viewers are unable to read what is being typed. The display can be restored from the obscured state to the clear state so quickly that this does not interfere with the user's work. Instituting the foregoing can be done by those having ordinary skill in the art using the disclosure and drawings herein.

In some other exemplary embodiments determination of attention point is also done for authorized individuals who are not the current user, but nevertheless detected by the system (e.g., by coming into the field of the image sensor) as well. For example, if the current user's manager is also looking at the display, and the current user looks away from the screen, such as to speak with the manager, the manager's attention point may remain on the display and thus prevent the display from becoming obscured. Instituting the foregoing can be done by those having ordinary skill in the art using the disclosure and drawings herein.

The obscuring, alteration, or otherwise making unusable for purposes of observing of sensitive displayed data when no authorized individual is determined to be paying attention to the display is referred to herein as "privacy mode". In some exemplary embodiments, the device's speakers or microphone (or both) are muted when privacy mode is activated. In some exemplary embodiments, video input devices are deactivated for purposes other than those of the current invention during privacy mode activation. For example, a video chat session or other program that was sending images from the video input device when privacy mode was activated would cease receiving video data from the video input. Alternatively, in some other embodiments, the live video input device data stream is replaced by a pre-arranged data stream, such as an advertisement, "hold message", music track, screen saver, or other stored or generated data feed. In still other exemplary embodiments, the specific changes made to displayed data, speakers, microphone, video device input stream, or other device aspects depends on factors such as the sensitivity of the displayed data, the length of time privacy mode has been active, the application programs running on the device, whether the user is still detected at the device, but not paying attention to the display or whether the user has left the device, the nature of other individuals or devices detected in the vicinity of the device, the rate of activation of privacy mode, or others as determined by those having skill in the art. Instituting the foregoing can be done by those having ordinary skill in the art using the disclosure and drawings herein.

In some exemplary embodiments the entire display is obscured, such as by pixilation, Gaussian blurring, pixel randomization, screen blanking, activation of a screen saver, substitution of alternative data, such as a slide show, static image or advertisement, or floating a logo or other image onscreen, opening of extra windows with false or deceptive text or images to distract unauthorized viewers, insertion of random text blocks or images or moving patterns on the screen, or in some other manner make the displayed private data unusable to those viewing it. In devices having a plurality of displays, obscuration can be applied to all, or to a subset of displays, or portions of a plurality of displays. In some exemplary embodiments, specified applications can be activated, selected or brought to the foreground of the display. Instituting the foregoing can be done by those having ordinary skill in the art using the disclosure and drawings herein.

Obscuration methods can be implemented in the device operating system, in hardware or firmware of devices or peripherals, by use of device drivers, static or dynamic libraries, or in application code (or any combination thereof) as well as in display peripherals or virtual machines. Any part of the device or related systems that affect how the ultimate display of data appears to a viewer can be used to implement some or all parts of one or more obscuration techniques, and a plurality of methods can be employed by any given exemplary embodiment. Methods for obscuration as used with the present invention are known to those having ordinary skill in the art, such as, by way of non-limiting example, the method described in U.S. patent application Ser. No. 12/325,191, filed 29 Nov. 2008 and published as U.S. Patent Application Publication No. 2009/0141895 A1, and in U.S. Patent Application Publication No. 2009/0273562 A1. Both of these published patent applications are incorporated herein in their entireties and for all purposes. Thus, those having ordinary skill in the art can implement obscuration as provided herein.

In some embodiments, the methods and software of the invention are implemented as a browser plugin, for example, as a downloadable application such as an ActiveX control or Java applet. In more particular embodiments in which the methods and software are implemented as a plugin, the protection extends only to the contents of the browser when it is displaying. Such an embodiment has the advantage of providing relevant protection with low system overhead. In more specific embodiments such as this, the software can be provided on the web server side, and it would be available to all users (or mostly all depending on browser). No product installation is required, just permission to run the embedded application.

FIGS. 6A and 6B illustrate two views of the same display, one clear (FIG. 6A) and one with privacy mode engaged (FIG. 6B) such that the displayed information is blurred to maintain privacy. Referring to FIG. 6A, in the clear display, the display region (6010) provides text (6020) and graphic(s) (6030) that are both plainly visible, permitting the user to work. In the display with privacy mode engaged, show in FIG. 6B, the display region (6110) shows the same text blurred into substantial unreadability (6112') and the graphic(s) also made substantially unrecognizable (6130'). Instituting the foregoing can be done by those having ordinary skill in the art using the disclosure and drawings herein.

In some other exemplary embodiments, only part of the display is obscured, while the remainder remains clear and usable. In some of these exemplary embodiments the portions of the display that are selected for obscuration are determined based on the type of data being displayed (e.g., text, images, video, graphics, etc.), by the type of application displaying the data (e.g., word processor, spreadsheet, web browser, image editor, accounting system, VoIP application, etc.), by the specific application displaying the data (e.g., MyPrivateApp.bin, MyDataBaseAccess.run, SomeOtherApplication.exe), by specific window or windows (e.g., window #1, window #14 and #22, etc.), by tags associated with data (e.g., age-related, location-related, or time-related restrictions, parental advisories, or security classification ratings), or specific parts of the display, such as particular fields in on-screen forms, redacted data sections, by recognition of the specific individuals who are in a position to observe the display, by determination of one or more characteristics of individuals positioned to observe the display (e.g., estimation of age, sex, recognition of a uniform, rank insignia, or ID badge) or by other factors as are determined to be appropriate by those having skill in the art. In some exemplary embodiments, gaze-tracker or other attention point determination methods can be used to apply pixilation or other obscuring techniques along a gradient, so that areas of the display other than the area where the user is focusing attention will be obscured, while the area near the attention point remains clear. Instituting the foregoing can be done by those having ordinary skill in the art using the disclosure and drawings herein.

In some exemplary embodiments, and where this is permitted by applicable security policies, the user can temporarily disable the features activation of privacy mode when giving presentations or performing other tasks where the current user's face is not visible to the attention sensor, but privacy of screen data is not required. In some exemplary embodiments such disablement persists until the user re-enables privacy mode activation. In other exemplary embodiments the user can disable privacy mode, but after a built-in, or configurable on some embodiments, time interval, a prompt is displayed to the user as a reminder that privacy mode activation has been suspended and requesting selection of an option. Available options can include re-enablement of privacy mode activation, leave privacy mode activation disabled but prompt again after a built-in or configurable delay, or to leave privacy mode activation disabled and to stop prompting for changes to this state. If no option is selected it is assumed that the user is no longer present and a default protection option is automatically selected. This is typically to resume protection of the screen. In embodiments that comprise centralized policy controls, the ability of a user to disable privacy mode activation, the options provided by the timed prompt, the time between prompts, and the default choice can all be controlled by a security policy provided by a centralized policy system. Instituting the foregoing can be done by those having ordinary skill in the art using the disclosure and drawings herein.

6.5 Unauthorized User Attention Detection

As described above, exemplary embodiments of the invention described herein provide means to detect face-like objects that are in view of a device's display, and to activate or deactivate privacy mode protection of sensitive data on said display. Some exemplary embodiments also provide means to recognize particular individuals, and to incorporate knowledge of the individual identity when deciding whether to activate or deactivate privacy mode, and what form of privacy mode to employ. Some exemplary embodiments also provide means for detecting or recognizing additional face-like objects (or both), such as authorized individuals who are not the current user or unauthorized individuals (or both). In yet other exemplary embodiments, means is provided to recognize objects such as video cameras, microphones or audio recorders or other potential sensors, and notify the user if any are discovered. Instituting the foregoing can be done by those having ordinary skill in the art using the disclosure and drawings herein.

When some exemplary embodiments of the current invention detect unauthorized, or unrecognized, face-like objects that are in a position to view the display, privacy mode can be activated to prevent unauthorized viewing of sensitive data. In some exemplary embodiments the distance of a detected face-like object from the display device is used as a factor in determining whether or not to activate privacy mode, whether a face-like object is an authorized user, or for other purposes, such as whether to generate a notification of the face-like object's presence. The distance to the face-like object can be estimated to a sufficient degree for this purpose using the size of a rectangle that bounds the face-like object in the images acquired by the video input device. The farther the face-like object is from the video input device, the smaller the bounding rectangle will be for a given face-like object. If the video input device is located adjacent to the display device, the distance estimation can be used directly. If the video input device is located at a distance from the display device, the distance between the face-like object and the display device can be estimated using well-known mathematical methods, such as trigonometry, and a knowledge of the spatial relationship between the display device and the video input device. In some exemplary embodiments, other method of estimating, calculating, or measuring the distance between a face-like object and the display device are used. These can include well-understood methods such as transmitting a signal (e.g., sound waves, microwaves, light, etc.) at the face-like object, and measuring the time required for a reflection to be returned, using occlusion of other objects that are in known locations by the face-like object, stereo-coincidence range-finding (i.e., use of two or more video input devices in separated locations viewing the same face-like object, with the difference in apparent location used to determine the actual location, such as by triangulation), or other methods as will be known to those with skill in the art.

While existing systems attempt to restrict data viewing to authorized users by simply not displaying data if the user is not authorized, these systems can not deal with a situation where an authorized user is viewing restricted data, and an unauthorized person is viewing the data over their shoulder. Exemplary embodiments of the current invention can deal with this problem by obscuring restricted data as soon as the unauthorized individual is found to be looking at the display, and by using natural human tendencies to limit such unauthorized display viewing. For example by showing the unauthorized viewing activity on the display device so that both the user and the intruder are alerted to the activity and its detection, most unauthorized viewers will immediately cease viewing the display. This effect can be enhanced by displaying additional warnings, such as a flashing "Recording" alert on the intruder display area to increase the "fear factor" of being caught. In some embodiments the video data is actually recorded. Exemplary embodiments also can protect data privacy by obscuring displayed information when the user is not looking at it, or when the user leaves the device for any reason, without the delay period typical of screen savers. Recognition of the user's face, entry of a password, presentation of additional authentication (e.g., biometric data input, smart card, token-based key access, RFID presence or a combination of some or all of these or others) can be required to exit privacy mode after such a departure. In some embodiments such additional authentication is required only when the user's departure exceeds a specified period of time. Instituting the foregoing can be done by those having ordinary skill in the art using the disclosure and drawings herein.

Alternatively or additionally, some exemplary embodiments alert the current user to the presence of such unauthorized display viewers, record the video input device data feed for later analysis, make entries in audit logs to track the occurrence of the unauthorized viewing, or take other actions to safeguard the privacy of displayed data, to track the occurrence of the unauthorized observation, or to inhibit the unauthorized viewer, or some combination thereof. In some exemplary embodiments, the user can specify the response, such as by manually enabling privacy mode, such as with a keyboard sequence or pointing device selection of an icon, by turning away from the display so that privacy mode is activated automatically, or by other appropriate action. Instituting the foregoing can be done by those having ordinary skill in the art using the disclosure and drawings herein.

Alerting the current user to the presence of additional or unauthorized viewers can be done in a number of different ways. For example, the video input device data feed can be shown on the device display, whether in full-screen mode, which might be disruptive to the current user's work, but would have the beneficial side-effect of obscuring the sensitive data, or in a smaller window that takes up only a portion of the display area. In either case, the unauthorized viewer would see the video data feed that includes him looking at the screen, and would know that the current user also can see this and know that his display is being observed. Getting caught like this tends to inhibit further unauthorized display viewing, and thus will improve data privacy for displayed data. In some exemplary embodiments the face or faces of the unauthorized viewer, or viewers, can be highlighted to call attention to them, such as by drawing a box around them in the video display, by enhancing contrast, color, brightness or other characteristics so that they stand out from the background, by outlining them with a contrasting color, by adding animated arrows that indicate their location in the video display, or by other means. Additional means for alerting the current user to the presence of unauthorized viewers implemented by alternative exemplary embodiments include, without limitation, flashing the display, changing aspects of portions of the display, such as having all window borders turn red or replacing a background image, or adding an icon to the display, displaying a pop-up message box with a message explaining that there is an unauthorized viewer, sounding an audio tone, playing back a video or audio recording, synthesizing an audio or video alert, vibrating the device, activating or deactivating an LED or other specific-purpose indicator on the sensor, the device or elsewhere, a pop-up, drop-down or other mechanical flag or indicator, or entering privacy mode. In some exemplary embodiments, alerting the user to the presence of unauthorized viewers can be done in a covert manner that does not inform the unauthorized viewer that he has been detected or unnecessarily call attention to the user or his activities. For example, an innocent-appearing but pre-arranged notice can appear that simulates an e-mail or other common notification, but which has content that informs the user that there is an unauthorized viewer, a music playback can be changed to a particular piece of music that is not otherwise played, or the device can be made to appear to malfunction briefly, such as the pointing device becoming unresponsive, the screen blinking off, or all keys entering a particular character rather than the character they are supposed to cause to be entered. To an unauthorized viewer, these will appear to be random malfunctions, but the user will know they indicate the presence of an unauthorized viewer, and the user can take appropriate action, such as changing position or device orientation, causing false or misleading data to be displayed, removing sensitive data from the display, etc. Instituting the foregoing can be done by those having ordinary skill in the art using the disclosure and drawings herein.

In the case of additional authorized individuals, individual recognition supports implementation of different forms of privacy mode based on the security level of the individuals observing the display, or avoidance of privacy mode where the security level or levels of the individual or individuals requires no restriction of sensitive information. For example, if the additional authorized individuals possess the same or higher security level than the current user, no implementation of privacy mode features is required and they can be permitted to observe the display without interference. If any of the additional authorized individuals has a lower security level than that required for access to displayed data, privacy mode can be implemented to at least a sufficient extent to prevent the insufficiently authorized individuals from observing it, or the current user can be alerted to their presence. If additional individuals are detected that are not recognized as authorized, privacy mode or current user alerting (or both) can be implemented. Instituting the foregoing can be done by those having ordinary skill in the art using the disclosure and drawings herein.

FIGS. 7A and 7B depict an exemplary video input device data feed (7010) that shows an authorized current user (7020), and an additional authorized user (7030). In this situation, the display (7110) remains clear, with text (7120) legible and graphics (7130) clearly drawn. Both the current user and the additional authorized user have access to displayed data. Instituting the foregoing can be done by those having ordinary skill in the art using the disclosure and drawings herein.

FIGS. 8A and 8B depict an exemplary video input device data feed (8010) with an authorized current user (8020) and an unauthorized, or unrecognized additional face-like object (8040). Since the additional face-like object has an attention point on the display (8110) (i.e., is facing the display, is close enough to see the display, and optionally has it's gaze direction pointed at the display), privacy mode is activated according to the security policy of this example, and the sensitive text (8120) and graphic data (8130) being displayed are obscured. The current user is also alerted to the presence of the unauthorized individual by a pop-up video window (8140) that shows the video input device feed with the unauthorized face-like object (8150) indicated by a contrasting color box (8160) placed around it. Instituting the foregoing can be done by those having ordinary skill in the art using the disclosure and drawings herein.

6.6 Security Policy Support

In some cases, such as in corporate or government use, centralized control of security policies, and associated control of individual device settings, is desirable to prevent individual users taking actions that endanger the organization's data security. In many cases users are permitted to set security-related options to a more secure state, but may not set them to a less secure state than that mandated by the security policy. Some exemplary embodiments of the current invention support centralized security policies by obtaining setting and user identification data remotely from a distributed database or from security policy systems. Obtaining data in this way makes required setting and user identification data available to as many devices as required, so that facial recognition is ubiquitously available to any device a user can sign onto. Within a corporate setting or a situation where diverse users in diverse locations need access to the same secure information, this allows many users to have access to data at a plurality of devices without the need to independently configure each user's identification at each individual device. FIG. 9 shows a schematic drawing of a central database (9010) sending user recognition data to a plurality of devices of various types, such as a tablet-based portable computer (9030), a PDA (9050), a desktop computer (9070), and a laptop or netbook computer (9090). The users being recognized (9020, 9040, 9060, and 9080) can be different users, or the same user at different devices, or any combination of these. Instituting the foregoing can be done by those having ordinary skill in the art using the disclosure and drawings herein.

Additionally, in a centralized security policy implementation it is possible to centrally define security-relevant settings, such as the time delay between loss of user attention and enablement of privacy mode, in accordance with organizational security and privacy policies. In such environments, users can be restricted from setting such configuration settings to less-secure values, and some exemplary embodiments support remote query of current settings for use by security policy compliance checkers. Centralized settings can be accessed and maintained using standard methods, such as those involving Active Directory, Windows Registry Group Policy, LDAP, or networked databases such as MySQL or Oracle. Instituting the foregoing can be done by those having ordinary skill in the art using the disclosure and drawings herein.

In addition to centralized configuration control, centralized security policy definition, distribution, and control can also include aspects such as distribution of updates to software or policies, tracking and reporting of their implementation, and restriction of devices that are not in compliance with current policy requirements. Centralized collection of security-relevant data (e.g., failed logins, unauthorized data viewing, unauthorized movement of devices, etc.) enables detection and reporting of potentially significant patterns so that appropriate response can be undertaken. Instituting the foregoing can be done by those having ordinary skill in the art using the disclosure and drawings herein.

Exemplary embodiments also can create event logs of all incidents of interest (e.g., user logins or login attempts, occurrence of privacy mode, length of privacy mode, incidence of unauthorized viewers, etc.) that is manually, by security profile, or on a device-by-device basis configurable and that can log to the individual device, to a central file, to a database, or to an incident reporting system or other location, and that will generate an alert in the event of an incident deemed significant according to security settings. For example, a failed login attempt can result in a failed login event being recorded in an intrusion database along with video of the intrusion attempt. This allows the user or authorized personnel to track and analyze a plurality of incidents and analyze to look for patterns. Instituting the foregoing can be done by those having ordinary skill in the art using the disclosure and drawings herein.

Some exemplary embodiments support a plurality of security policies being defined, with the currently active security policy defined by the device's current location, such as office, home, airport, coffee shop, library, car, etc. Determination of current location can be performed using various methods, depending on device capabilities. For example, in devices with Global Positioning System receivers, location can be accurately determined any time there is adequate signal reception. Alternatively, some exemplary embodiments can use video capture device data to perform object recognition processing and identify objects in view in the local environment (curtains, filing cabinets, television, etc.), and use this information to determine current location. Still other exemplary embodiments rely on particular symbols, objects or other indicators to be present in the video capture device data. For example, a sign on the wall behind the user reading, "OFFICE", or "HOME", bar code labels, or even simple geometric shapes, such as a circle for home, a square for office, and lack of either to indicate "in public". Symbols or objects used can be specific to a particular user or device, so that a first person who is away from home at a colleague's house will not have his device go into "home" mode based on the colleague's "HOME" sign on the wall behind him. Instituting the foregoing can be done by those having ordinary skill in the art using the disclosure and drawings herein.

6.7 Implementation in Separate Devices

In systems where data is processed in a first device, such as a computer, and data display is performed by a second device, such as a display device, display obscuration can be performed by the second device, with the first, or other device, such as a video input device, providing direction as to what parts of the display to obscure and when to obscure them. Such direction can be provided as part of a video data signal to the display device, or carried on a separate medium, such as a USB cable or Bluetooth wireless link. In other exemplary embodiments, where the display device comprises a camera, gaze tracker or other appropriate sensor means, the determination of the portion of the display to obscure, and the times at which to obscure it, can be made by the display device, and the obscuration performed by the display device without external assistance. Instituting the foregoing can be done by those having ordinary skill in the art using the disclosure and drawings herein.

FIG. 10 depicts a schematic diagram of an exemplary embodiment wherein a video capture device (10010) provides video data (10020) to a computer device's (10030) user attention processor (10040). The user attention processor analyzes the video data to identify face-like objects, perform facial recognition, and determine attention point of each face-like object detected. Based on the determined identities of the face-like objects discovered and their current attention points, the user attention processor (10040) determines the display portions to obscure, if any, and the proper method of obscuration consistent with current option settings. This information is used to control (10050) the display processor (10060), which is preparing display output (10090) for the applications (10080) as they request it (10070), such that the display output (10090) is properly clear or obscured as directed by the user attention processor (10040) when it is sent to the display monitor (10100) and output (10110) for the current user or others to see. Instituting the foregoing can be done by those having ordinary skill in the art using the disclosure and drawings herein.

FIG. 11 depicts a schematic diagram of an alternate exemplary embodiment wherein a computer device (11010) which is processing applications (11020) that generate display requests (11030) that are sent to a display processor (11040) to generate display data (11050) that is sent to a display monitor (11100). The display monitor comprises a video capture device (11130) configured to collect image data of a current user or the device's environment, or both, and send this image data (11140) to a user attention processor (11120). The display monitor (11100) also routes the received display data (11110) to the user attention processor (11120). The user attention processor (11120) uses the video image data to detect face-like objects and their attention points, and to appropriately modify the received display data (11110) for output (11150) on the monitor display (11160). In exemplary embodiments of this type, face-like objects nearest the display are assumed to be the current user, and face-like objects at a greater distance are assumed to be unauthorized viewers. In some alternate exemplary embodiments of this type user recognition data (11200) is made available (11210) to the display monitor (11100) and used by the user attention processor (11120) to perform facial recognition on the video image data (11140) and identify authorized viewers individually. The user recognition data (11200) can be provided by various means, such as an internal data store in the display monitor (11100) that is pre-loaded with data or which acquires the data by configuration by the user, a removable data storage device, such as a USB "thumb drive" or memory stick, through a wired or wireless link from the computer device (11010), or through a network or other connection to a data server, central security policy control system, or other source. Instituting the foregoing can be done by those having ordinary skill in the art using the disclosure and drawings herein.

FIG. 12 depicts a schematic diagram of yet another alternate exemplary embodiment wherein the user attention processor (12020) is provided as an aspect of a video capture device (12010), such as a gaze tracker. In such embodiments the data provided by the video capture device (12030) is not a video data stream, but user attention data, such as display coordinates where user attention is currently positioned, or gaze direction coordinates and vectors that permit calculation of the user attention point. The data from the video capture device (12030) is sent to the computer's display processor (12120) where it is used to modify the display requests (12140) made by the computer's applications (12130) so as to obscure or permit them to appear in clear form on the display monitor (12210). The processed display data (12150) is sent to the display monitor (12210) and output (12230). In some embodiments, the video capture device (12020) does not make use of user recognition data and simply supplies data to permit determination of user attention point. In some alternate exemplary embodiments (not shown), user recognition data is supplied to the video capture device and used to determine user identity as in the prior example. In still other alternate exemplary embodiments a plurality of video capture devices are used (not shown), with a second or other video capture device being used for facial recognition, as in the previously described embodiments, and this determination is used in conjunction with the attention point information provided by the first video capture device (12010) to decide whether and how to implement a privacy mode. In yet other alternate exemplary embodiments, the video capture devices (12010) can optionally support a normal video feed mode, but when such mode is active, a positive indication, such as an LED being lit, is present so the user is aware that the video capture device (12010) is feeding video data rather than user attention data, and in some implementations a data signal is also present so that application software (12130) can detect the video capture device mode and behave accordingly. Instituting the foregoing can be done by those having ordinary skill in the art using the disclosure and drawings herein.

In some environments, such as those dealing with classified materials, cameras can be problematic. Permitting unrestricted use of camera data by application software can lead to security breaches and is frequently prohibited in such environments. In such situations, or elsewhere as needed, some exemplary embodiments can make use of a virtual machine system, as shown in FIG. 13. FIG. 13 depicts a schematic of an exemplary embodiment where the user attention processor (13140) that receives the video data feed (13020) from the video capture device (13010), and processes it for purposes of attention point determination, face detection or recognition, and determination of the display portions to obscure or not obscure, is instantiated in a virtual machine (13120) instantiated on the computing device (13110). The video data feed from the video capture device (13020) is routed only to the virtual machine (13120), and not to any applications (13180) that are running natively on the computing device (13110). The virtual machine (13120) routes the video data feed it receives (13130) to the user attention processor (13140) for use in identifying face-like objects, performing facial recognition, etc. as previously described. Only limited information (13150 & 11160) leaves the virtual machine (13120) for the display processor (13170), such as attention point location, identity of faces in view, and location of faces in view, or, in some embodiments, only instructions as to which display areas to obscure or not obscure. Applications (13180) send their normal display requests (13190) to the display processor (13170), and have no access to video feed data (13020). The application display requests (13190), as modified by instructions from the user attention processor (13200) are sent to the display monitor (13210) and output on the display (13230). Instituting the foregoing can be done by those having ordinary skill in the art using the disclosure and drawings herein.

6.8 Sentinel Function

In some exemplary embodiments, a "sentinel mode" is provided that detects movement in locations such as doorways, cubicle openings, hallways or rooms and puts the computer into privacy mode, logs an event, alerts the current user, or takes other specified action, such as powering down the device, sending an e-mail, etc. if movement is detected. In some exemplary embodiments the device takes action only if the detected movement is a person, as opposed to foliage moving in a breeze, an animal passing by, a mechanical device such as a fan or robot vacuum cleaner or other movement. In still other exemplary embodiments, action is triggered only if the detected person is not recognized, or if the detected person focuses attention on the device's display. Instituting the foregoing can be done by those having ordinary skill in the art using the disclosure and drawings herein.

6.9 Sensor Access Control

Some exemplary embodiments can be configured to limit access to microphone, camera, or other devices to specific applications, so that confidential work can be protected without interference to or by non-confidential applications.

In some cases video capture and microphone devices feature an indicator, such as a light, a sound, a change in color of a light, an onscreen icon or color change or border flag, a physical switch or slider or other mechanism, that lets the user determine whether the video capture or microphone are active. Some exemplary embodiments can supply such indication even when the hardware devices do not. This can be accomplished by the exemplary embodiment allocating the device for its exclusive use, directing all inputs to itself, providing a pseudo-device interface for use by other applications, and passing data between the device and other applications as required, while providing the proper indications to the user when the device is in use or not in use. Some exemplary embodiments can also restrict or permit data exchange between devices and applications so as to provide positive control over the use of device capabilities, and prevent surreptitious use by malware programs or other users. Allocation of devices for exclusive use can be accomplished by means such as operating system resource allocation requests, resource locks, use of device drivers that restrict interaction to specified programs, or programs that can supply proper credentials, redirection of hardware or software interrupt vectors so that device interaction is performed only with the exemplary embodiment, or by other means well understood by those having skill in the art. The method chosen can vary depending on the operating system and hardware devices involved. Instituting the foregoing can be done by those having ordinary skill in the art using the disclosure and drawings herein.

FIG. 14 depicts a schematic of an exemplary embodiment where a video capture device (14010) sends video data (14020) to a video device monitor (14110) component in a computing device (14120). The video device monitor passes video data (14130) to applications (14140) as required and permitted, while also requesting the display processor (14170) to provide an on-display indication of the video capture device's activation status (14160). The display processor sends application data (14150) and any requested video device monitor information (14160) as display data (14190) to the display monitor (14210) where it is displayed to the user (14230). In some exemplary embodiments, the video device monitor (14110) can activate or deactivate (14180) a dedicated indicator (14115), such as an LED, mechanical flag, light bulb, or other indicator as will be well understood by those having skill in the art. Similar methods can be used to direct, restrict, monitor or indicate the in-use status of other devices (or some combination thereof), such as microphones, gaze trackers, infrared receivers or transmitters, audio output devices (e.g., speakers or headphones), Bluetooth receivers or transmitters, or other devices that can be used to sense the local environment, provide user input, or export data from a computing device. Instituting the foregoing can be done by those having ordinary skill in the art using the disclosure and drawings herein.

In some embodiments, the ability to restrict or redirect device access as described above is also used to selectively disable particular devices, to alter the functioning of particular devices, or to substitute other data for the inputs or outputs of specified devices, based on configuration settings and the presence or absence of the user, or the user's attention to the device. For example, if the user shifts attention away from the device, the configuration settings can indicate that web camera inputs be blocked, or that other data, such as a screen saver, advertisement, hold message, last captured frame prior to the web camera input blockage, or a combination of these or other video or static image data, be substituted for actual camera input data. Applications that are using web camera inputs at the time this occurs may not be made aware of any change, and continue to receive what appears to them to be web camera input, but the actual web camera input is suppressed. Alternatively, in some exemplary embodiments, such applications can be controlled to alter their functioning when user attention is detected or not detected, through APIs they provide, or by means of simulating user keyboard, mouse or other inputs. For example, a DVD player application can be made to pause playback when the user looks away from the display device, or a video recorder application can be paused when the user is not facing the camera. Other actions can be taken based on user attention as well. For instance, when camera input is blocked or substituted, microphone inputs can be muted as well. This is useful, for example, when a user is distracted from a video conference by a supervisor entering their office. As the user looks away from the display device, others on the video conference call are not enabled to overhear or see the discussion between the user and the user's supervisor. When the user looks back to the display device to continue the video conference, the diversion or blockage of the web camera data is halted and normal video input resumed, and the microphone is un-muted. By controlling device input and output in this manner, all applications that make use of these devices effectively gain increased privacy control features, without requiring that any of these applications, such as video conferencing, Voice over Internet Protocol ("VoIP"), MP3 players, or others, be modified in any way. Instituting the foregoing can be done by those having ordinary skill in the art using the disclosure and drawings herein.

In addition to the increased privacy control and convenience of these capabilities, there is also potential for improved efficiency for all devices, and longer battery life in portable devices by turning off or reducing power use by devices when the user is not present, or not paying attention to the device. For example, by turning off display backlighting, reducing processor speed, pausing DVD playback, spinning down hard disks, or disabling Bluetooth transmitters or receivers. Those with skill in the art will be aware of other power saving or efficiency improving means available to particular devices. Some exemplary embodiments provide such features directly, by incorporating configuration options and capability for specific device or application control into their designs, while other exemplary embodiments provide a more general capability that permits the user or others to implement such configuration and specific capabilities separately, such as by providing an API to specify actions and methods for application and device control to the exemplary embodiment, by providing a mechanism to request invocation of other applications when events such as user attention loss or user attention detection occur, or by exporting user attention state in a manner that makes this information available to one or more applications or the operating system without further action on the part of the exemplary embodiment (for example, by altering data in shared memory locations, by use of mechanisms such as mutexes that synchronize a plurality of processes or threads, by broadcast mechanisms such as multicasting, or other means that may be supported by one or more operating systems. Instituting the foregoing can be done by those having ordinary skill in the art using the disclosure and drawings herein.

In addition to enhancing privacy and reducing power consumption, detection of user presence and attention is also useful for scheduling tasks that can make use of a device's capabilities to an extent that interferes with normal use of the device. For example, running virus scans, installing software updates, or backup of data can all involve resource consumption that can adversely impact use of the device by a user. By knowing when the user is not paying attention to the device, or is away from the device, such operations can be performed at times when there will be no adverse impact on normal device use by the user.

6.10 Gesture-Based Control and Inputs

In some exemplary embodiments, attention point information and gestures of various types made by the current user can be used to control various aspects of device operation. For example, the system can simulate 3D display capabilities to move the displayed windows in concert with the user's head motion, such as to let a user look "behind" foreground windows to see windows that are partially or fully obscured, or to minimize windows that seldom get user attention or increase the size of windows (or both) in response to user attention. Instituting the foregoing can be done by those having ordinary skill in the art using the disclosure and drawings herein.

In some exemplary embodiments, gestures can comprise facial expressions, hand movements, head movements, or other user actions, alone, in combination with each other, or in combination with keyboard or pointing device inputs, audio inputs such as spoken phrases, tones or taps, and be used to trigger specific actions, such as entry of specified key sequences, running of specified applications, sending of e-mails, activation of privacy mode, real-time transmission of video data to a pre-arranged location, or wiping of stored device data. Such a capability can be used for the convenience of the user in some cases, and for more serious purposes in others, such as calling for emergency assistance or preservation of data security if a device is being stolen. Instituting the foregoing can be done by those having ordinary skill in the art using the disclosure and drawings herein.

6.11 Anti-Theft Functionality

The capability to recognize authorized users can be used to implement a video-based anti-theft system. If the device is moved, without an authorized user in view, an alarm can be sounded, the device can activate privacy mode, make audit log entries, call for help, begin transmitting its location or video input device feed (or both), or take other specified actions as desired, such as wiping out stored data. Movement of the device can be detected using acceleration sensors in the device or its hard drives, by use of a GPS receiver, or visually through analysis of the video capture device data feed. Any time an unauthorized face-like object is detected during a theft situation, the device can record or transmit the image (or both) to assist with locating the device, or the thief, and with prosecution of the thief. Instituting the foregoing can be done by those having ordinary skill in the art using the disclosure and drawings herein.

6.12 Exemplary Architecture

Described herein is an exemplary non-limiting architecture for a system capable of embodying at least some of the capabilities of the current invention. Those with skill in the required arts will be aware that alternative implementations are possible, and that the methods and systems described below are for purposes of illustration, and are not intended to be limiting in any way.

6.12.1 Operation Modes

Exemplary embodiment functionality can be characterized as comprising three operational modes: "Basic", "Eavesdropper Warning", and "Sentinel".

Basic mode involves detecting the presence of a user, and determining when the user is looking at the device display and using this information to activate privacy mode at any time the user is not looking at the device display.

Eavesdropper warning mode adds additional privacy features by detecting whether a plurality of faces are looking at the device display and displaying faces other than the authorized user's in a window on the device display. Some exemplary embodiments support an option for activating privacy mode when a plurality of faces are detected, even when one of them is the user.

Sentinel mode involves orienting the video input device such that it observes a scene of interest, such as a doorway, window, lobby or hallway, and detecting face-like objects or significant motion of objects in the view. For example, if the video input device is aimed down a hallway, those approaching by that route are detected before they can attain a position where they can observe the device display. In such a scenario, the scene, or portions of it, such as the faces of the approaching individuals, is displayed on the display device. In some exemplary embodiments there is an option for activating privacy mode instead, or in addition to such display.

Instituting the foregoing can be done by those having ordinary skill in the art using the disclosure and drawings herein.

6.12.2 Security Service Process

There are functions necessary to the operation of the current invention that are restricted on many operating systems. Performing any of these functions requires elevated privileges not typically available to ordinary users or applications. Examples of such functions include disabling of user log-offs while in privacy mode, restricting access to devices such as video input devices, removal or installation of software, and setting or changing user passwords. It is undesirable to have the entire current invention run under an administrative account, since some users may not have access to such an account, as is typical for users in corporate, government agency, or other large organizations. To provide these capabilities despite such restrictions, the current invention can be implemented in at least two parts: a main application process and a security service process that provides privilege restricted functionality to the main application process. By dividing functionality in this way, privilege restricted capabilities are isolated into one or more separate services that can be instantiated with appropriate privileges in order to carry out operations that require elevated privileges on behalf of the main application when requested. The specific required privileged functionality is made available to the main application process without enabling other uses of the elevated privileges, or granting privileges to portions of the main application process that do not require them. Instituting the foregoing can be done by those having ordinary skill in the art using the disclosure and drawings herein.

FIG. 15 is a diagram depicting the relationships between an exemplary main application process (15010), an exemplary security service process (15020), a typical operating system (15030), and the privileged functions (15040) it provides to privileged callers. When requesting non-privileged functions, the main application process (15010) can call the operating system (15030) directly (15050). Since the main application process does not typically have elevated privileges it can not invoke privileged operating system functions (15040). When privileged functions are required, the main application process (15010) instead makes one or more requests (15070) to the security service process (15020), which is installed with the required privileges. The security service process (15020) then makes calls (15060) to the operating system privileged functions (15040) and informs (15070) the main application process (15010) of the results. Instituting the foregoing can be done by those having ordinary skill in the art using the disclosure and drawings herein.

The security service process implementation will vary depending on the design of the operating system of the device it will be instantiated upon. In some operating systems, such as Microsoft Windows, it can be implemented as a service. In some other operating systems, such as Unix or Linux, it can be implemented as a daemon. In still other operating systems it can be implemented as an installable system service, a loadable operating system module, a device driver, a built-in modification of the operating system itself, or by other means known to those with skill in the operating systems in question, When necessary, the main application process will contact the security service process by means of an Application Programming Interface (API) or other means appropriate to the design of the particular embodiment, such as an operating system call, device driver call, software interrupt, system signal, etc. and send it a request. Through this mechanism, the security service process supports commands such as:

1. Install the service
2. Delete the service
3. Start the service
4. Stop the service
5. Pause the service
6. Disable administrative functions (custom command)
7. Enable administrative functions (custom command)

When the main application process is in use to protect the device display, it is useful to disable certain functionality in the operating system that could be used to interfere with the functioning of the main application process or other aspects of the system. For example if the "control", "alt" and "delete" keys are pressed simultaneously on Microsoft Windows platforms, the system can be shut down, or a task manager application can be invoked. The task manager can be used to stop system processes, such as the main application process, alter process priorities, shut down the system, change passwords, or change which user is logged in. Disabling access to the task manager can be necessary to preserve proper functionality of the system, and doing so is a privileged function. The main application process can request the security service process to perform this operation and disable all of the problematic features at once. Instituting the foregoing can be done by those having ordinary skill in the art using the disclosure and drawings herein.

6.12.3 Main Application Process

In the exemplary embodiment, the main application process is responsible for dealing with the processing of the input video, or other sensor, data, decision-making about the user's presence and activity as well as unauthorized individuals, implementation of privacy mode, alerts, data logging, and security policies and all other processing that doesn't require elevated privileges. An exemplary embodiment of a main application process can be implemented as a multi-threaded process, the two main threads being:

1. Controller Processing Thread
2. User Interface (UI) Thread

FIG. 16 depicts a diagram showing some of the components of the main application process (16000) and their relationships. The video input device (16010) provides a stream of video image data to the image processing loop (16020) in the controller processing thread (16030). The image processing loop (16020) generates render messages (16040) and alert messages (16050) for the message pump loop (16060) of the user interface thread (16070). The user interface thread (16070) sends requests to do renders (16080) to the display device to the renderer component (16090) of the controller processing thread (16030) to generate obscured displays as needed. The renderer (16090) sends rendered output (16100) to the display component (16110) that handles the output to the display device. The display component (16110) also handles alert display messages (16120) from the user interface thread (16070). The user interface thread (16070) also updates the configuration settings (16130) used by the controller processing thread as the user makes changes to them. The security service process (16200) handles requests to the operating system that require elevated privileges on behalf of the main application process (16000). Instituting the foregoing can be done by those having ordinary skill in the art using the disclosure and drawings herein.

As depicted in FIG. 17, a video data stream (17000) is fed from a video input device (17010) to an image processor component (17020) of the controller processing thread (17025). The image processor (17020) prepares individual video frames (17060) for processing by the face tracker (17030), and motion detector (17050) components. The face tracker (17030) component locates face-like objects in video frames, while the motion detector (17050) determines whether there has been motion in the scene between the current video frame and previous video frames. The face tracker (17030) passes the video frame along with face-like object data (17070) it has generated to a face recognizer component (17080). The face recognizer component attempts to match face-like objects with previously stored face data so that known individuals can be recognized. The face tracker (17030) also provides detected face data (17090) to a face protection logic component (17100) that uses face tracker data (17090) as well as face recognition data (17110) to decide whether there is cause to enable or leave privacy mode, or to generate an alert to the user, such as display of an unrecognized face-like object, If there is cause, the privacy mode (17120) or user alert (17130) components are invoked to request appropriate actions from the user interface thread (17300). The face protection logic (17100) component uses settings data (17200) to determine when privacy mode should be engaged, and when to alert the user. The privacy mode (17120) and user alert (17130) components also use settings data (17200) to control their actions, such as how to implement privacy mode, what form of user alert to request, etc. The motion detector component (17050) provides motion data (17055) to the motion protection logic (17105) component, which uses the motion data to decide whether there is cause to enable or leave privacy mode, or to generate an alert, such as sending a message to an e-mail address, placing a message on the display device, or logging an event to a log server. Instituting the foregoing can be done by those having ordinary skill in the art using the disclosure and drawings herein.

As each frame is processed by the controller processing thread (17025), a render message is sent to the user interface thread (17300), along with messages or other required data for any alerts which need to take place.

Asynchronously to the controller processing thread (17025), the user interface thread (17300) processes any messages to render the screen, to display alerts, or to obscure the screen to implement privacy mode. In addition, any interaction from the user (e.g., keyboard input, mouse movement, or gestures) is handled. For example, starting or stopping privacy mode, invoking setup or configuration dialogs, or stopping the system.

Instituting the foregoing can be done by those having ordinary skill in the art using the disclosure and drawings herein.

6.12.4 Controller Processing Thread

The controller processing thread handles the bulk of the main process functionality. It is responsible for instantiating and controlling all components. When a user makes changes to the application through the user interface (UI), the UI interacts with the controller processing thread, which sets required variables in the appropriate components. Likewise, when centrally controlled security policy settings change, the controller processing thread is notified, and sets required variables in the appropriate components. The controller process thread and the user interface thread are implemented as separate threads due to facial recognition and identification processing being very CPU-intensive. If these were done in a single thread the UI functionality could be slowed to an unacceptable extent. By implementing them in separate threads, the operating system can schedule them separately, or even give priority to the user interface thread to maintain adequate responsiveness to the user. Instituting the foregoing can be done by those having ordinary skill in the art using the disclosure and drawings herein.

Processing video data to detect face-like objects, perform face recognition, and other functions of exemplary embodiments of the current invention can require a substantial percentage of available compute resources. When the user is performing tasks that also require substantial percentages of available resources, these can be slowed by the activities of the exemplary embodiments. To reduce the impact on the user, some exemplary embodiments monitor available system compute resource utilization levels, and adjust their use so as to maintain an adequate level for user activities. Adjustments can comprise altering the frequency of checks for face-like objects, altering the frequency of face recognition attempts, altering the number of congruence points that are checked to determine whether a particular image matches a particular stored face recognition image, reducing the priority of less time-critical processing elements of the system, such as checks for security policy updates, reducing the number of images cached in memory, caching log entries longer between writes to storage, or by other means as will be well understood by those having skill in the art.

When a user is not detected, some exemplary embodiments take advantage of the situation by performing resource-intensive activities, such as purging older face images, flushing cache to log files, processing newly acquired face images to identify congruence points, and checking for and downloading security policy updates or new authorized user recognition data. Some exemplary embodiments adjust compute intensive tasks, such as frequency of checks for face-like objects, or face recognition attempts, so as to use more compute resources when a user is not present. This can be done, for example, to improve responsiveness to the user's return, and cause the system to more rapidly recognize the user and return settings to the "user present" state more quickly. In some of these exemplary embodiments there is support for initiating other tasks when a user is not detected, such as defragmenting disks, running virus scans, performing software updates, or system backups. In some exemplary embodiments there is a time delay between the user leaving the system and the initiation of such processing, so that it is less likely that the user has only turned away momentarily. In addition to starting such tasks, recognition that the user has left the machine can also be used to alter system configuration settings, such as foreground/background processing time ratios, firewall settings, screen brightness, audio output volume, or to trigger activation of screen savers, or power conservation modes, or even place the system in "sleep" mode when the user leaves. Instituting the foregoing can be done by those having ordinary skill in the art using the disclosure and drawings herein.

For operations that require interaction with the display device (such as implementing privacy mode or displaying alerts), the controller process thread sends a message to the user interface thread, which then services the command as appropriate. When the user interface thread receives a message to render, it services the message by calling on a rendering function in the controller process thread. The rendering function evaluates a protection status flag that is maintained by the controller processing thread, and either enables or disables privacy mode. If privacy mode is not enabled, the rendering function causes the display device to display un-obscured data. If privacy mode is enabled, the rendering function retrieves a saved copy of the un-obscured display data (saved when privacy mode was first activated), and applies a protection effect as specified by the configuration settings (e.g., pixelate, blank, generate false data, etc.), and then causes the renderer display data to be displayed in place of the un-obscured display data. Instituting the foregoing can be done by those having ordinary skill in the art using the disclosure and drawings herein.

6.12.5 Image Processor

The image processor is responsible for controlling the video input device (e.g., webcam) and converting the video input into a sequence of 2D image frames for processing by the controller processing thread. The image processor makes use of available interfaces for controlling the video input device and acquiring video input data. These can include, without limitation, video capture APIs such as Video for Windows and Direct Show (both available commercially from Microsoft Corp., Redmond, Wash.).

The image processor provides an API for use by other parts of the system of the invention to enable them to request initiation of video data input, etc. The image processor API comprises the following functions:

Initialize: Performs implementation-specific initializations required prior to accessing the video input device.

Open: Connects to the video input device and begins input of video data.

Close: Shuts down the video data input stream and disconnects from the video input device.

GrabFrame: Causes a single frame image to be acquired from the video input device.

RetrieveFrame: Returns a reference to the currently grabbed frame's image data.

UpdateDisplayImage: Updates the internal saved image data used for displaying a video capture frame GetSubImage: Returns a copy of a rectangular region of the currently grabbed image frame.

Instituting the foregoing can be done by those having ordinary skill in the art using the disclosure and drawings herein.

6.12.6 Face Tracker

The face tracker component is used to find and track face-like objects within an image. It can be implemented as an interface to both first and third party external function libraries that implement the required functionality. The face tracking interface comprises the following API functions:

Initialize: Performs implementation-specific initializations.

DetectFaces: Accepts an input image and returns an array of detected face-like object rectangles, each one describing the limits of the face-like object in the input image.

Instituting the foregoing can be done by those having ordinary skill in the art using the disclosure and drawings herein.

6.12.7 Face Recognizer

The face recognizer component identifies, catalogs, and matches face-like objects with one another. It can be implemented as an interface to both first and third party external function libraries that implement the required functionality.

The face recognizer makes use of a "face entry" data structure for holding all of the information necessary to identify a face, comprising the following information:

Version String: Version ID used for compatibility with future development.

Name String: The name given to the individual face entry record.

Image: The image data associated with the face.

Face Data: Implementation-specific data representing how the implementation characterizes the face.

Feature Data: An array of point data that locates identified facial features within the image.

The face recognizer provides an API for use by other parts of the system of the invention to enable them to request initiation of face recognition. The face recognizer API comprises the following functions:

Initialize: Performs implementation-specific initialization.

IdentifyFace: Takes as input a bounding rectangle sub-image returned from the face tracker and image processor and returns a pointer to a face entry structure RegisterFace: Takes as input a pointer to a face entry structure returned from the IdentifyFace function, and registers it with the face recognizer for future operations such as face matching and face recognition.

GetFace: Takes as input the name of the face and returns a pointer to a face entry structure.

GetFaces: Returns an array of pointers of all face entry structures currently registered.

RemoveFace: Takes as input the name of a face to remove (unregister), and removes (unregisters) it.

ClearFaces: Clears (unregisters) all faces.

RecognizeFace: Takes as input a bounding rectangle sub-image returned from the face tracker and image processor, and returns a pointer to the face entry matching the specified face-like object, if one exists. Otherwise returns a "not found" status.

MatchFace: Takes two face entry structures and a specification for an acceptable difference between the two faces as input, and returns "true" if the faces are a match within the specified accuracy.

SaveData: Takes a file name as input and saves all of the face entry structures registered to non-volatile storage.

LoadData: Takes a file name as input and reads the face entry structures from the file and registers them.

Instituting the foregoing can be done by those having ordinary skill in the art using the disclosure and drawings herein.

6.12.8 Motion Detector

The motion detector is a component that calculates motion in a series of images. This can be accomplished by identifying the pixels that have changed over successive images, as governed by a threshold of change value. Pixel changes that fall below the specified threshold are ignored. The threshold is used to filter out changes in pixel data resulting from causes such as noise introduced as a natural by-product of the image capture process. To speed processing and provide an additional noise filter, the motion detector also transforms the scale of images before processing. This reduces the number of pixels that must be processed in the remainder of the motion detection processing. Once the pixel changes have been calculated, they are summed across the image and motion is said to occur if the sum of the changes exceeds a specified threshold. In addition to determining if there is any motion shown in the sequence of images, the motion detector also identifies sub-sections within the images that bound adjacent pixels which have been determined to have changed. These sub-sections are characterized as "moving objects".

The motion detector provides an API for use by other parts of the system of the invention to enable them to request initiation of motion detection. The motion detector API comprises the following functions:

Reset: Resets the motion detection component and prepares it to track motion.

SetReduction: Sets the width and height scale factors for use in reducing the input images before identifying motion.

DetectMotion: Takes as input an image obtained from the image processor and returns "true" if motion has been detected between the input image and previous input images.

GetMovingObjects: Called after motion has been detected, this function returns a reference to an array of rectangles that define the locations of moving objects.

WasMotionDetected: Returns "true" if motion was detected the last time that DetectMotion was called.

Instituting the foregoing can be done by those having ordinary skill in the art using the disclosure and drawings herein.

6.12.9 Effect Implementation

The effect implementation permits installation of various modules for generating effects useful for implementing privacy mode, such as pixilation, generation of false text, Gaussian blurring, etc. The controller processing thread loads each required effect module at runtime as specified by the configuration settings.

Effect modules receive an input image (e.g., an image of the current display device output), performs a transformation of the image, and produce an output image which comprises an obscured version of the original input image. Examples of effects that can be employed for this purpose include, but are not limited to, mosaic, Gaussian blur, pixilation, partial merging with one or more other images, and total image replacement with another pre-designated, generated, or randomly chosen image. Each effect module supplies functionality comprising:

Reset: reset the effect generation parameters to their default settings.

LoadConfiguration: load any configuration data required for implementing the effect.

SaveConfiguration: save any configuration data required for implementing the effect.

GetConfigurationData: return the location of the current configuration data.

SetConfigurationData: set the current configuration data.

GetDialog: get access information to the UI configuration functional used by the effect to obtain effect configuration settings from a user.

GetDisplayName: retrieve the name of the effect for display in the main application user interface, or for other purposes where identification of the effect is required.

Effect: invoke the effect. Receives the following input arguments:

Source Image: the input image the effect is to be applied to.

Destination Image: location to deliver the output image to.

Effect Factor: a value useful to control the effect generation. For example, this could be a number representing the speed of a gradual implementation of the effect (e.g., an incremental blur)

Configuration Info: current effect configuration data.

Still other embodiments include a Software Development Kit (SDK) by which developers may develop custom effects, as well as support for other OS operations, including controlling active desktop applications.

Instituting the foregoing can be done by those having ordinary skill in the art using the disclosure and drawings herein.

6.12.10 Renderer

The renderer is responsible for controlling the appearance of the display device output when privacy mode is engaged. This comprises rendering the results of effect implementation to the display device. The renderer can optionally overlay or include a company logo or other information, such as advertising, in addition to the displayed data modified by one or more effects. Such additional inclusions can overlay, replace, alternate with, or be used to further alter the obscured display data, such as by distorting the obscured data in the form of a company logo.

The rendered can, on some operating systems perform its function by creating an application display window that spans the display device, whose content is made up of the output of the effect implementation as further modified by the rendered. A renderer can be created for each display device that is to be protected.

The renderer provides an API for use by other parts of the system of the invention to enable them to request display alterations. The renderer API comprises the following functions:

Initialize: Initializes the renderer to the display device dimensions, creates any internal data structures necessary, and prepares the renderer to function as required.

SetMediaDirectory: defines the location where the renderer can obtain required support data files.

Render: invoke the renderer to render to the display device it is associated with.

Instituting the foregoing can be done by those having ordinary skill in the art using the disclosure and drawings herein.

7 CONCLUSION

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships or physical or logical couplings between the various elements. Such simplifications will be apparent to, and understood by, those having ordinary skill in the art. Furthermore, those having ordinary skill in the art understand that many alternative or additional functional relationships and physical or logical connections can be present in a actual device made whiteout departing from the scope or spirit of the present invention. Moreover, various modifications and adaptations will be readily apparent to those having ordinary skill the art without departing from the spirit and scope of the present invention.

What is claimed:

1. A computer-controlled system for regulating the interaction between a computer and a user of said computer based on the environment of said computer and said user, said computer-controlled system comprising:

a data input device and a data output device, each of said data input device and said data output device in electronic communication with said computer;

an image sensor, said image sensor being configured to collect facial recognition data proximate to said computer, said image sensor being further configured to communicate said facial recognition data to a security processor, wherein said facial recognition data comprises user data of said user and unauthorized user data of an unauthorized user;

a user security parameter database, said database including data encoding security parameters associated with said user and said unauthorized user, and said database configured to communicate with said security processor; and said security processor configured to receive said facial recognition data and said security parameters associated with said user and said unauthorized user to (i) determine a calibrated attention point of said user with respect to said data output device and substantially locate said calibrated attention point of said user with respect to said data output device, and (ii) determine an unauthorized attention point of said unauthorized user, said security processor being further configured to at least partially control the operation of said data input device and said data output device in response to said calibrated attention point of said user and said unauthorized attention point of said unauthorized user.

2. The system of claim 1, wherein said data input device and said data output device include at least one of a video display or a microphone.

3. The system of claim 2, wherein said system includes a video display.

4. The system of claim 3, wherein said facial recognition data includes image data relevant to determining the presence of a third party in a region behind said user.

5. The system of claim 4, wherein said security processor is configured to display a warning upon detecting the presence of a third party in said region.

6. The system of claim 5, wherein said warning comprises an image of said third party.

7. The system of claim 4, wherein said security processor is configured to modify the operation of said video display upon detecting the presence of a third party in said region.

8. The system of claim 4, wherein said system includes a microphone for collecting sounds from said user, and said security processor is configured to modify the operation of said microphone upon detecting the presence of a third party in said region.

9. The system of claim 3, wherein said image sensor device is further configured to track said user's gaze on said display, and said security processor is configured to modify the operation of said video display upon detecting that said user's gaze is not on said video display.

10. The system of claim 9, wherein said system includes a microphone for collecting sounds from said user, and said security processor is configured to modify the operation of said microphone upon detecting that said user's gaze is not on said video display.

11. The system of claim 1, wherein said user security parameter database is at a location remote from said computer.

12. A method for regulating the interaction between a computer and a user of said computer based on the environment of said computer and said user, said method comprising:

obtaining facial recognition data from an image sensor device configured to collect facial recognition data, said image sensor being configured to communicate said facial recognition data to a security processor and pass said facial recognition data to said security processor, wherein said facial recognition data comprises user data of said user and unauthorized user data of an unauthorized user;

receiving user security parameters from a user security parameter database including data encoding security parameters associated with said user and said unauthorized user at said security processor; and using said security processor to (i) determine a calibrated attention point of said user with respect to a data output device and substantially locate said calibrated attention point of said user with respect to said data output device in electronic communication with said computer, (ii) determine an unauthorized attention point of said unauthorized user, and (iii) at least partially control the operation of at least one of a data input device and said data output device connected with said computer in response to said calibrated attention point of said user and said unauthorized attention point of said unauthorized user.

13. The method of claim 12, including detecting the presence of a third party in a region extending behind said user.

14. The method of claim 13, including displaying a warning to said user in response to detecting the presence of a third party in said region, or modifying the operation of at least one of said data output device and said data input device comprising a video display device or a microphone connected to said computer, or any combination thereof, in response to said detecting the presence of a third party in said region.

15. The method of claim 12, including detecting that said user's gaze has moved away from a video display device connected with said computer.

16. The method of claim 15, including detecting the presence of a third party in a region extending behind said user, and displaying a warning to said user in response to said detecting the presence of a third party in said region, or modifying the operation of at least one of a video display device or a microphone connected to said computer, or any combination thereof, in response to said detecting the presence of a third party in said region.

17. A non-transitory computer-readable medium containing computer-readable program control devices thereon, said computer-readable program control device being configured to enable a computer to:

obtain facial recognition data from an image sensor device configured to collect facial recognition data, said image sensor being further configured to communicate said facial recognition data to a security processor and pass said facial recognition data to said security processor, wherein said facial recognition data comprises user data of said user and unauthorized user data of an unauthorized user;

receive user security parameters from a user security parameter database including data encoding security parameters associated with said user and said unauthorized user at said security processor; and enable said security processor to (i) determine a calibrated attention point of said user with respect to a data output device and substantially locate said calibrated attention point of said user with respect to said data output device in electronic communication with said computer, (ii) determine an unauthorized attention point of said unauthorized user, and (iii) at least partially control the operation of a least one of a data input device and said data output device in response to said calibrated attention point of said user and said unauthorized attention point of said unauthorized user.

18. The non-transitory computer-readable medium of claim 17, wherein said computer-readable program control devices are further configured to cause said security processor to display a warning to said user, or modify the operation of at least one of said data output device and said data input device comprising a video display device or a microphone connected to said computer, or any combination thereof, in response to detecting the presence of a third party in a region proximate to said computer.

19. The non-transitory computer-readable medium of claim 17, wherein said computer-readable program control devices are further configured to enable said security processor to determine that said user's gaze has moved away from a video display device connected with said computer.

20. The non-transitory computer-readable medium of claim 19, wherein said computer-readable program control devices are further configured to enable said security processor to display a warning to said user, or modify the operation of at least one of a video display device or a microphone connected to said computer, or any combination thereof, in response to detecting the presence of a third party in a region proximate to said computer.

* * * * *